(12) United States Patent
Welter et al.

(10) Patent No.: US 7,470,376 B2
(45) Date of Patent: Dec. 30, 2008

(54) PHOTOCHEMICALLY ACTIVE CHIRAL COMPOUNDS AND COMPOSITIONS CONTAINING THE SAME

(75) Inventors: Thomas R. Welter, Webster, NY (US); Krishnan Chari, Fairport, NY (US)

(73) Assignee: Industrial Technology Research Institute, Chutung, Hsinchu (TW)

( * ) Notice: Subject to any disclaimer, the term of this patent is extended or adjusted under 35 U.S.C. 154(b) by 337 days.

(21) Appl. No.: 10/977,110

(22) Filed: Oct. 29, 2004

(65) Prior Publication Data

US 2006/0091357 A1    May 4, 2006

(51) Int. Cl.
| | |
|---|---|
| C09K 19/54 | (2006.01) |
| C09K 19/38 | (2006.01) |
| C09K 19/58 | (2006.01) |
| C07D 493/10 | (2006.01) |
| C07C 69/76 | (2006.01) |

(52) U.S. Cl. .................. 252/299.01; 549/334; 549/344; 560/80; 560/256; 252/299.2

(58) Field of Classification Search ............ 252/299.01, 252/299.2; 560/80, 256; 549/334, 344
See application file for complete search history.

(56) References Cited

U.S. PATENT DOCUMENTS

| | | | |
|---|---|---|---|
| 5,668,614 A | 9/1997 | Chien et al. | |
| 6,217,792 B1 | 4/2001 | Parri et al. | |
| 6,589,445 B2 | 7/2003 | Sugiyama et al. | |
| 6,645,397 B2 | 11/2003 | Ichihashi | |
| 7,052,743 B2 * | 5/2006 | Welter et al. .................. | 428/1.1 |
| 7,119,859 B2 * | 10/2006 | Chari et al. .................... | 349/88 |
| 7,150,900 B2 * | 12/2006 | Welter ......................... | 428/1.3 |
| 7,214,834 B2 * | 5/2007 | Welter ......................... | 568/719 |
| 7,329,368 B2 * | 2/2008 | Welter .................... | 252/299.01 |
| 2003/0111639 A1 | 6/2003 | Yumoto et al. | |
| 2003/0122105 A1 | 7/2003 | Ichihashi | |
| 2003/0137632 A1 | 7/2003 | Kawabata | |
| 2004/0019228 A1 | 1/2004 | Yumoto et al. | |

FOREIGN PATENT DOCUMENTS

| | | |
|---|---|---|
| JP | 2002 179681 | 6/2002 |
| JP | 2003 306491 | 10/2003 |
| JP | 2005-281215 | * 10/2005 |

OTHER PUBLICATIONS

Birman et al., "1,1_-Spirobiindane-7,7_-diol: a novel, C2-symmetric chiral ligand", Tetrahedron: Asymmetry 10 (1999) 125-131.*
Giovanni Gottarelli and Gian P. Spada, "Induced Cholesteric Mesophases: Origin and Application," Mol. Cryst. Liq. Cryst., 1985, vol. 123, pp. 377-388.
Gian Piero Spada and Gloria Proni, "The Nematic Liquid Crystal Phase as a Probe of the Molecular Shape Helicity," Enautiomer, vol. 3, pp. 301-314.
Zvonimir Dogic and Seth Fraden, "Cholesteric Phase in Virus Suspensions," Langmuir 2000, 16, pp. 7820-7824.
C. Mioskowski, J. Bourguignon, and S. Candau, Chem. Phys. Letters, vol. 38, pp. 456-459 (1976).
Peter Van de Witte, Juan Galan, and John Lub, Liquid Crystals, vol. 24, pp. 819-827 (1998).
Richard A. van Delden, Marc B. van Gelder, Nina P.M. Huck, and Ben L. Feringa, Advanced Functional Materials, vol. 13, pp. 319-324 (2003).
Sandi Campbell, Yuhui Lin, Uwe Müller, and L-C. Chien, Chem. Mater., vol. 10, pp. 1652-1656 (1998).
Giovanni Gottarelli and Gian P. Spada, "Induced Cholesteric Mesophases: Origin and Application," Mol. Cryst. Liq. Cryst., 1985, vol. 123, pp. 377-388.
Gian Piero Spada and Gloria Proni, "The Nematic Liquid Crystal Phase as a Probe of the Molecular Shape Helicity," Enautiomer, vol. 3, pp. 301-314, 1998.
Zvonimir Dogic and Seth Fraden, "Cholesteric Phase in Virus Suspensions," Langmuir 2000, 16, pp. 7820-7824
C. Mioskowski, J. Bourguignon, and S. Candau, Chem. Phys. Letters, vol. 38, pp. 456-459 (1976).
Peter Van de Witte, Juan Galan, and John Lub, Liquid Crystals, vol. 24, pp. 819-827 (1998).
Richard A. van Delden, Marc B. van Gelder, Nina P.M. Huck, and Ben L. Feringa, Advanced Functional Materials, vol. 13, pp. 319-324 (2003).
Sandi Campbell, Yuhui Lin, Uwe Müller, and L-C. Chien, Chem. Mater., vol. 10, pp. 1652-1656 (1998).

* cited by examiner

*Primary Examiner*—Shean C Wu
(74) *Attorney, Agent, or Firm*—Alston & Bird LLP

(57) ABSTRACT

The present invention relates to a phototunable chiral dopant represented by the following structure:

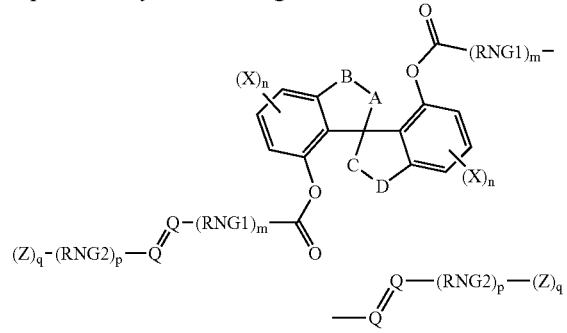

wherein:
A, B, C and D are independent divalent groups; X and Z are any independently selected substituent; n is an integer and independently varies from 0 to 3; q is an integer and independently varies from 0 to 5; RNG1 and RNG2 independently represent any ring group; m represents an integer independently varying from 0 to 4; p represents an integer independently varying from 1 to 4; Q independently represents a carbon C—$R_C$, or nitrogen, wherein $R_C$ is independently hydrogen or any substituent. The invention also relates to the use of the dopant in a liquid crystalline composition and a display containing the same, as well as a material composition comprising an enantiomeric excess of one enantiomer of the compound.

32 Claims, No Drawings

PHOTOCHEMICALLY ACTIVE CHIRAL COMPOUNDS AND COMPOSITIONS CONTAINING THE SAME

FIELD OF THE INVENTION

The present invention involves the formation of chiral nematic liquid crystal (LC) compositions using nematic materials in combination with phototunable chiral dopants.

BACKGROUND OF THE INVENTION

Chiral nematic, also known as cholesteric, liquid crystalline materials are useful in a variety of applications including various liquid crystal display components, reflective films, optical filters, polarizers, paints, and inks, among others. Methods for preparing such materials are well established. See, e.g., G. Gottarelli and G. Spada, *Mol. Cryst. Liq. Crys.*, 123, 377 (1985); G. Spada and G. Proni, *Enantiomer*, 3, 301 (1998); and U.S. patent application Ser. No. 10/651,692 now U.S. Pat. No. 7,052,743.

While early uses of chiral nematic compositions relied upon mixtures composed mostly of chiral components, more recently, such materials are composed of nematic liquid crystal mixtures combined with small amounts of chiral dopants. In such new compositions, the properties of the nematic host material, for example viscosity, birefringence, electrical anisotropy, and magnetic anisotropy among others, are tailored to the desired usage by altering the chemical composition of the nematic mixture, and then a chiral dopant is incorporated to induce helical twisting, so as to provide the desire chiral nematic pitch. It is apparent that the properties of this chiral nematic composition are therefore a combination of the properties of the nematic host plus those of the dopant. It is further well understood that by reducing the amount of dopant, the properties of the host nematic liquid crystal formulation might be better preserved. Certainly, reducing the concentration of a specific dopant also reduces the pitch of the resulting chiral nematic formulation.

Many uses of chiral nematic compositions require the formulation to reflect or transmit visible light, thus requiring compositions with substantial helical twist, i.e. short helical pitch ("p"). These considerations indicate that dopants that induce large amounts of nematic helical twist per unit concentration are prized. The figure of merit for such materials is its Helical Twisting Power ("HTP" or $\beta$).

A dopant material's HTP ($\beta$) is defined, in a specified nematic host at a particular temperature, by Eq (1):

$$\beta = (pcr)^{-1} \quad (I)$$

wherein the "p" is the measured helical pitch of the doped nematic ($\mu$m); "c" is the measure of the dopant concentration (usually in terms of mole fraction, weight fraction, or weight percent on a unitless scale, wherein mole fraction and weight fraction is on a scale of 0 to 1); and "r" is the enantiomeric excess of the dopant (on a unitless scale of 0 to 1). Enantiomeric excess (r), defined as the absolute value of the difference in mole fraction (F) of the two enantiomers in a sample, equals $|F_{(+)} - F_{(-)}|$. Thus, for a racemic mixture, r equals $|0.5-0.5|$, which equals 0; for an enantiomerically pure material r equals $|1.0-0|$, which equals 1; and for a 75% pure mixture the r equals $|0.75-0.25|$, which equals 0.5. The larger the HTP, the lower the concentration of dopant needed to provide a specific pitch, and thereby yield a particular reflectance or transmission.

The pitch of a chiral nematic formulation can be measured using a variety of optical techniques. For example, see Z. Dogic and S. Fraden, *Langmuir*, 16, 7820 (2000). The dopant concentration is as formulated and the enantiomeric excess can be measured via chiral high-performance liquid chromatography (HPLC) or nuclear magnetic resonance (NMR) spectroscopy. Typically, for useful enantiomerically pure dopants, their HTP's range from one to several hundred ($\mu m^{-1}$). Dopants with twisting power greater than 100 (based on dopant mole fraction) are often described as "high twist" dopants. The discovery of new dopants, particularly high twist dopants, is important to broadening the utility of chiral nematic formulations.

Not only can chiral nematic liquid crystals be formulated to reflect various wavelengths of incident electromagnetic radiation, but it is well understood that that reflected light is circularly polarized, depending upon the sense of chirality of the helical pitch. Thus, a chiral nematic displaying a right-handed helical mesostructure will reflect right-handed incident light. For many applications, it is useful to be able to reflect both right-handed and left-handed senses of circularly polarized light, for example, in a vertically layered structure. It is further well known that enantiomers of a chiral dopant structure induce the opposite polarity of helical rotation and, therefore, afford oppositely polarized light reflections. For this reason, the preparation of enantiomeric pairs of dopants for use in separate light modulating layers can be particularly useful.

There are three general sources for obtaining substantially enantiomerically pure organic compounds for use as dopants or, more likely, as synthetic precursors for dopants: (1) compounds available from natural sources; (2) the preparative separation of racemic mixtures of enantiomers; or (3) chiral synthetic methods that directly afford desired enantiomers. Most commonly, only the latter two methods provide access to both enantiomers of a potential dopant. Natural sources generally provide only one of any enantiomeric pair, reflecting the fundamental chirality of life. Thus, using natural sources for dopants or their precursors can lead to limitations in dopant utility. The discovery of new dopants available from non-natural sources would therefore be especially useful.

In practical applications, several dopants may be incorporated into nematic hosts to provide chiral nematic liquid crystal formulations. This may be done due to chemical incompatibility of the dopants with the host material, to allow for temperature sensitivity compensation or for other reasons. When combining dopants within one chemical class or of various structural classes, the handedness of the helical twist must be taken into account. Thus, the effects of dopants that induce the same handedness of helical twisting are additive. However, if the helical handedness of two particular dopants are antithetical, the effects of these dopant twists will cancel. This is readily apparent considering racemic mixtures of chiral dopants: each enantiomer of the mixture could have a large HTP, however the theoretical twist that one enantiomeric dopant might induce is exactly negated by the contrary helicity of its enantiomer's effect. A liquid crystal formulation, doped with a combination of two or more dopants with varied handednesses of helical twist, will display a twist related to a linear combination of the concentration, HTP, and handedness of each dopant.

Further, it is could be advantageous to control or alter the HTP of a chiral dopant or dopant mixture after formulation of the chiral nematic liquid crystal mixture or during fabrication of a liquid crystal containing device or perhaps even after device manufacture. Previous workers have discovered photochemical methods for such processing. For an early example, see C. Mioskowski, J. Bourguignon, and S. Candau, *Chem. Phys. Letters,* 38, 456 (1976). In the manufacture of various liquid crystal display components, it can be useful to alter the wavelength of reflected light after the liquid crystal mixture has been incorporated into the device, for example, in a liquid crystal color filter array fabrication. One might envisage coating a blue reflective (yellow transmissive) chiral nematic liquid crystal, then in a subsequent step alter the pitch of the mesophase by inducing structural modifications in the chiral dopant. If such modifications led to reduction in mesophase pitch, shorter wavelength colors could be formed, thus perhaps providing a red reflective (cyan transmissive) coating. Methods for the in situ altering of the pitch of chiral nematic liquid crystal's are needed.

A known approach toward this end is provided by dopant photochemistry. Irradiation of certain chemical structures can afford isomerization or fragmentation reactions. Such reactions have been used to design photoactive dopants. A search of the chemical literature indicates that several varieties of phototunable chiral dopants have been identified. Usually these involve the isomerization of a double bond from a trans-configuration to a cis-configuration (E to Z) or the reverse, e.g. P. Van de Witte, J. Galan, and J. Lub, *Liquid Crystals,* 24, 819 (1998); R. van Delden, M. van Gelder, N. Huck, and B. Feringa, *Adv. Funct. Mater.,* 13, 319 (2003) and references therein. Early work was accomplished with thermally reversible azobenzene compounds. Work that is more useful has been accomplished using olefins. Epimerization of 1,1'-binapth-2-ol dopants has also been exploited for such uses, i.e. U.S. Pat. No. 5,668,614; S. Campbell, Y. Lin, U. Miller, and L-C. Chien, *Chem. Mater.,* 10, 1652 (1998) and references therein. A particularly interesting series of disclosures by workers at Fuji Photo Film Company have been published, i.e., U.S. Pat. Appl. 2004 019,228 A1; U.S. Pat. Appl. 2003 122,105 A1; U.S. Pat. Appl. 2003 137,632 A1; U.S. Pat. Appl. 2003 111,639 A1; U.S. Pat. No. 6,589,445 B2; U.S. Pat. No. 6,645,397 B2; Jpn. Kokai Tokkyo Koho JP 2003 306,491; Jpn. Kokai Tokkyo Koho JP 2002 179681; these workers used various bis-cinnamate esters of isosorbide, for example, Ex-1

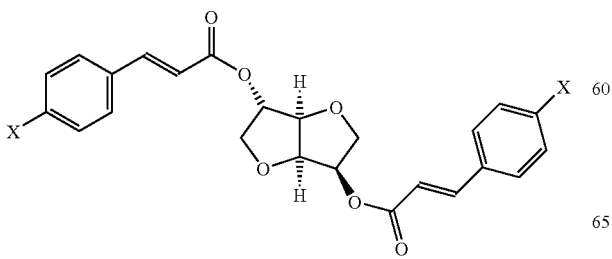

-continued

Ex-2

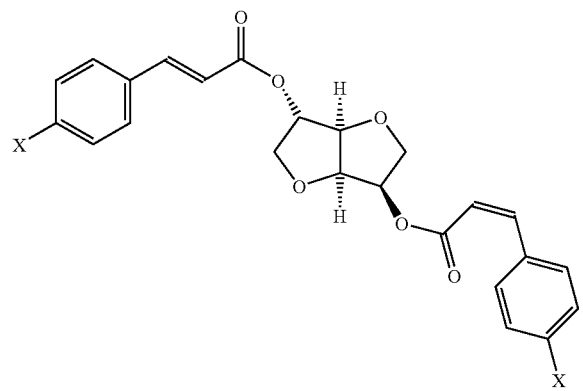

Ex-3

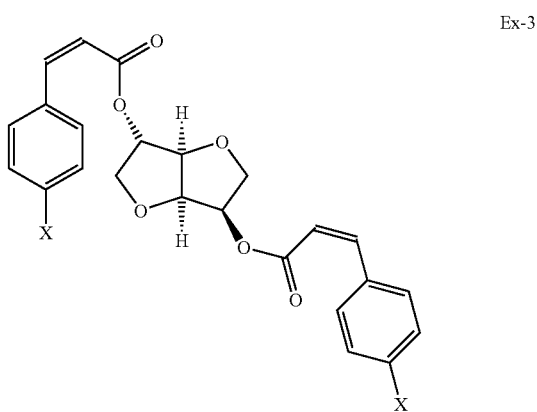

Ex-1, Ex-2, Ex-3 As the phototunable chiral dopants. The general isosorbide class of chiral dopant has been extensively explored and patented by Merck (Darmstadt, Germany) i.e. U.S. Pat. No. 6,217,792 B1 and related disclosures. As is evident from the above considerations, the effectiveness of molecules as chiral dopants or, more specifically, as phototunable dopants is not readily predictable. It depends upon the subtle interplay of molecular chirality, chirality transfer from the dopant to the host material, and photochemically induce structural alterations.

PROBLEM TO BE SOLVED

There remains a need for new chiral dopants that provide high HTPs and excellent phototunability.

SUMMARY OF THE INVENTION

The present invention relates to a phototunable chiral dopant represented by the following structure:

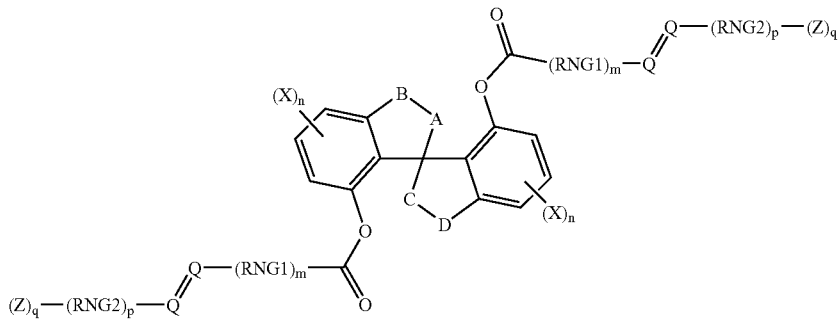

wherein:

A, B, C and D are independent divalent groups; X and Z are any independently selected substituent; n is an integer and independently varies from 0 to 3; q is an integer and independently varies from 0 to 5; RNG1 and RNG2 independently represent any ring group; m represents an integer independently varying from 0 to 4; p represents an integer independently varying from 1 to 4; Q independently represents a carbon C—$R_C$, or nitrogen, wherein $R_C$ is independently hydrogen or any substituent. The present invention also relates to a material composition comprising an enantiomeric excess of one enantiomer of a compound

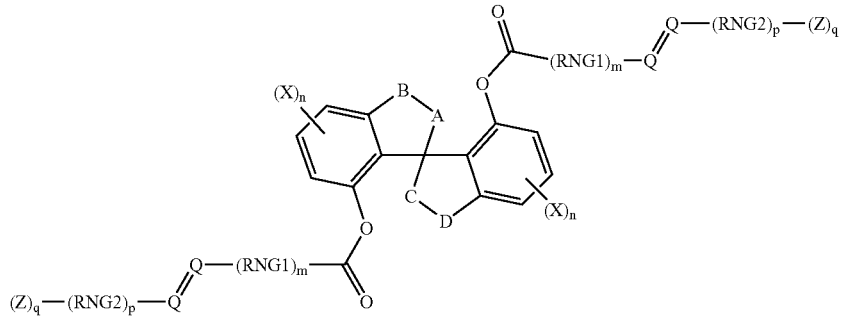

wherein A, B, C and D are independent divalent groups; X and Z are any independently selected substituent; n is an integer and independently varies from 0 to 3; q is an integer and independently varies from 0 to 5; RNG1 and RNG2 independently represent any ring group; m represents an integer independently varying from 0 to 4; p represents an integer independently varying from 1 to 4; Q independently represents a carbon C—$R_C$, or nitrogen, wherein $R_C$ is independently hydrogen or any substituent. The invention also relates to an article comprising a substrate and a liquid crystalline layer coated thereon, wherein said liquid crystalline layer comprises a nematic host and a phototunable chiral dopant represented by the following structure:

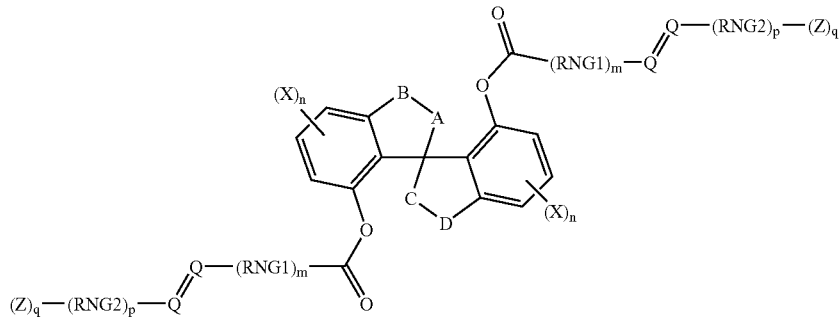

wherein A, B, C and D are independent divalent groups; X and Z are any independently selected substituent; n is an integer and independently varies from 0 to 3; q is an integer and independently varies from 0 to 5; RNG1 and RNG2 independently represent any ring group; m represents an integer independently varying from 0 to 4; p represents an integer independently varying from 1 to 4; Q independently represents a carbon C—$R_C$, or nitrogen, wherein $R_C$ is independently hydrogen or any substituent and a liquid crystalline composition comprising a nematic host and a phototunal chiral dopant wherein said phototunable chiral dopant is represented by the following structure:

having an enantiomeric excess of one enantiomeric form. Yet, another aspect of the invention relates to chiral nematic liquid crystal formulations comprising such chiral dopants. Such formulations are useful in displays and other products. Optionally the chiral dopants can be capable of polymerization.

These new photodopants represent a broadening of the technology embodified by Ex-1, Ex-2- and Ex-3, described above. Chiral dopants of this and similar structural classes bear a chiral core structure with two or more pendant liquid crystal-like sidechains. When used as dopants, these sidechains extend from the chiral core into bulk nematic host.

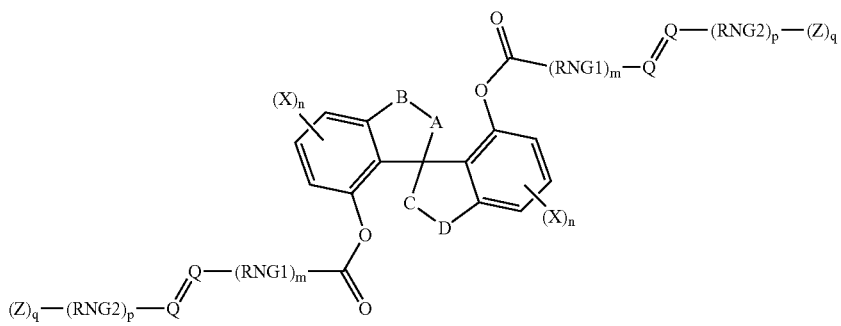

wherein A, B, C and D are independent divalent groups; X and Z are any independently selected substituent; n is an integer and independently varies from 0 to 3; q is an integer and independently varies from 0 to 5; RNG1 and RNG2 independently represent any ring group; m represents an integer independently varying from 0 to 4; p represents an integer independently varying from 1 to 4; Q independently represents a carbon C—$R_C$, or nitrogen, wherein $R_C$ is independently hydrogen or any substituent.

ADVANTAGEOUS EFFECT OF THE INVENTION

The present invention includes several advantages, not all of which are incorporated in a single embodiment. The applicants have now discovered a new class of such phototunable chiral dopants with which non-natural chiral materials provide high HTP's and excellent phototunability. These liquid crystal chiral dopants allow alteration of display color after media is coated. This is accomplished via irradiation of the liquid crystal composite with ultraviolet or perhaps visible light.

DETAILED DESCRIPTION OF THE INVENTION

The invention relates to a novel class of compounds useful as phototunable chiral dopants, which compounds are available in both enantiomeric forms. Another aspect of the invention relates to the phototuning of chiral nematic helical pitch. Another aspect of the invention relates to such compounds having an enantiomeric excess of one enantiomeric form, which are useful in liquid crystal formulations. Such formulations are advantageous in displays, in color filters, and the manufacture of displays and color filter, and in various other products and processes.

The present invention relates to a novel class of compounds useful as phototunable liquid crystal chiral dopants, which compounds are available in both enantiomeric forms. Another aspect of the invention relates to such compounds The interaction between these chirally disposed sidechains and the nematic host then induces helical twist to the bulk mesophase via a process known as chirality transfer. Empirically it has been found that long, narrow, calamitic liquid crystal-like sidechains, often 1,4-substituted biphenyls or phenyl benzoates, are most efficient at such chirality transfer. Bent or angularly substituted groups are less effective at transferring chirality from the chiral core to the bulk nematic mesophase. Thus, it might be explained that extended trans-cinnamates such as Ex-1, would act as dopants that are more effective, i.e. have a greater HTP, than the Ex-2 or Ex-3 photoisomers with bent sidechains. Thus, irradiation of trans-cinnamates, i.e., Ex-1, with suitable ultraviolet light allows trans-to-cis isomerization, apparently resulting in a lower HTP. Blue reflecting chiral nematic liquid crystal films using Ex-1 type dopants can be shifted to green, red or infrared reflecting films via irradiation with ultraviolet (UV) light. In an alternative scheme a liquid crystal might be doped with a low twisting dopant form, i.e. Ex-3 to perhaps a red reflecting state. Irradiation of this state could convert some Ex-3 to the more highly twisting Ex-2 or Ex-1 forms, thus shortening the liquid crystal pitch and hypsochromically shifting the reflection. In yet another implementation scheme, the phototunable dopant's HTP may be of the opposite twist handedness than the host's primary dopant. In such a scheme, photochemically reducing the HTP of the photoactive dopant would serve to decrease the liquid crystal pitch.

Certain compounds represented by the following Structure 1 Are useful as a source of phototunable chiral dopants. In particular, the enantiomerically enriched form of such compounds, including the substantially enantiomerically pure form, introduced into nematic compositions, afford useful chiral nematic mixtures that can be altered via irradiation with light, that is, are phototunable.

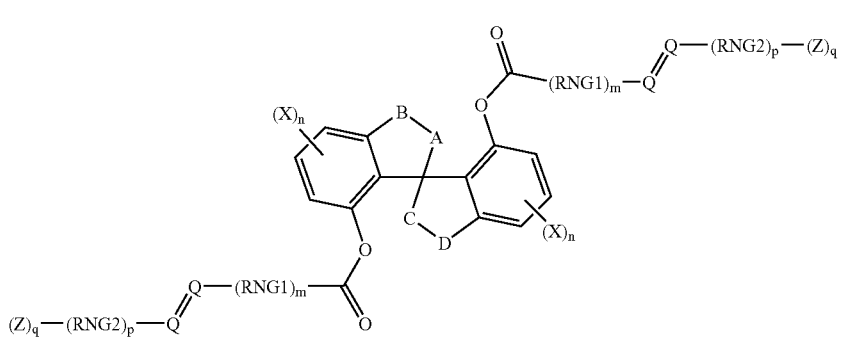

As evident, compounds of Structure 1 comprise a central nucleus comprising a spirodiphenoxy diester moiety. In Structure 1 A, B, C and D are independent divalent groups; each X and Z are any independently selected substituents, n's are integers and independently vary from 0 to 3, q's are integers that vary from 0 to 5 and the RNG1 and RNG2 groups are independently any ring either, aromatic or alicyclic, carbocyclic or heterocyclic, substituted or unsubstituted, m's are integers and independently vary from 0-4 and p's are integers and independently vary from 1-4; Q's are independently either a carbon C—$R_C$, or nitrogen, wherein $R_C$'s are independently hydrogen or any substituent. The stereochemistry of these double bonds (-Q=Q-) independently may be trans (E) or cis (Z). Preferably, A, B, C, and D are such that A and B comprise a first five or six-membered ring, and C and D comprise a second five or six-membered ring which rings share a spirocarbon atom to which A and C are attached.

A, B, C and D in Structure 1 can independently be any bivalent substituent such as methylene, ethylene, oxygen, sulfur, sulfoxyl, sulfonyl, carbonyl, mono-substituted nitrogen (N—$R_N$), di-substituted carbon ($R_1$—C—$R_2$), wherein $R_N$, $R_1$ and $R_2$ Are independently hydrogen or any substituent. It is preferred the A, B, C and D independently be methylene or di-substituted carbon ($R_1$—C—$R_2$). It is more preferred that either A or B (and/or C or D) be methylene with the other being either methylene or di-substituted carbon ($R_1$—C—$R_2$). It is most preferred that A and B (and/or C and D) are both methylene. In one embodiment, A and B are the same, respectively as C and D. $R_C$, $R_N$, $R_1$ and $R_2$ can independently be hydrogen or the same as X (vide infra); when present, organic carbon-containing substituents having 1 to 12 carbon atoms are preferred.

The X substituent in Structure 1 can be any substituent. Suitable X substituents include, but are not limited to alkyl, aryl, halogens; cyano (—CN); hydroxyl; alkoxy, aryloxy, alkylacyloxy (—O(C=O)R), arylacyloxy (—O(C=O)Ar), carboalkyl (—C(=O)R), carboaryl (—C(=O)Ar), carboalkoxy (—C(=O)OR), carboaryloxy (—C(=O)OAr) amino, alkylamino, isocyanato, nitro, carboxy, aminocarbonyl, alkylcarbonamido (—NHC(=O)R), arylcarbonamido (—NHC(=O)Ar), sulfonamido, sulfamoyl, sulfo, sulfonate, or alkylammonium each either substituted or unsubstituted; as well as a siloxane residue or polymerizable groups as mentioned below. Preferred carbon-containing substituents include alkyl groups of about 1-20 carbons, cycloalkyl groups of about 1-20 carbons, aryl groups of about 6-20 carbons, alkaryl groups of about 6-20 carbons, and heterocyclic groups having at least one heteroatom and 2-20 carbons; all either substituted or unsubstituted.

The value on n can be independently 0, 1, 2, or 3. In one preferred embodiment of Structure 1 Both subscripts n are 0 (as in the case X is hydrogen in Structure 2) or 1 (as in the case when X is a substituent in Structure 2 Below).

RNG1 and RNG2 independently may be any ring but preferably 1,4-phenylene in which, in addition, one or more methines (=CH—) may be replaced by nitrogen (—N=); 1,4-cyclohexyl in which, in addition, one or more non-adjacent methylene units may be replaced by O or S; 1,4-cyclohexylene, 1,4-bicyclo[2.2.2]octylene, piperidine-1,4-diyl, naphthalene-1,6-diyl, dechydronaphthalene-1,6-diyl, 1,2,3,4-tetrahydronaphthalene-1,6-diyl, in which each of these groups be unsubstituted or mono-substituted or poly-substituted with halogen, cyano, isocyanato, or nitro groups; or alkyl, alkoxyl or alkanoyl groups bearing 1-12 carbons where one or more hydrogens may be substituted with chlorine or fluorine. The value of m maybe be independently 0,1,2,3, or 4 and the value of p may be independently 1, 2, 3, or 4. In a preferred embodiment the value of m is 1 and the value of p is 1. In another preferred embodiment the value of m is 0 and the value of p is 1.

Z can be independently the same as X (vide supra) and the value of q can independently be 0, 1, 2, 3, 4, or 5. In a preferred embodiment, q is 1 and Z is alkyloxy of 1-10 carbons. In another preferred embodiment q is one and Z is arylcarbonamido (—NHC(=O)Ar), wherein Ar a ring, but is preferably a carbocyclic aromatic ring, substituted or unsubstituted.

A preferred embodiment is represented by the following Structure 2:

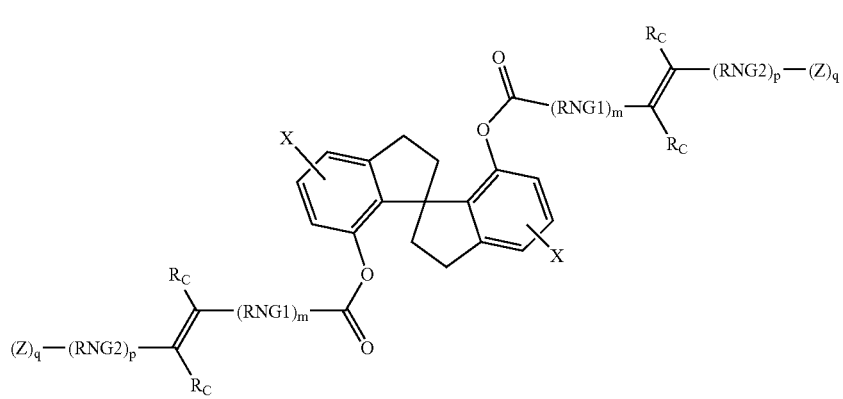

wherein X and $R_C$ Are independently hydrogen or a substituent.

Another preferred embodiment is represented by the following Structure 3:

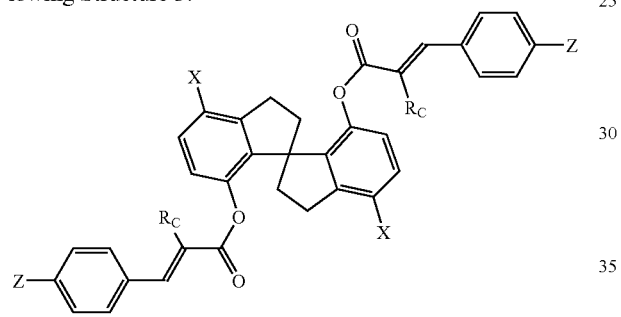

wherein Z and $R_C$ Are independently hydrogen or any substituent.

Another preferred embodiment is represented by the following Structure 4:

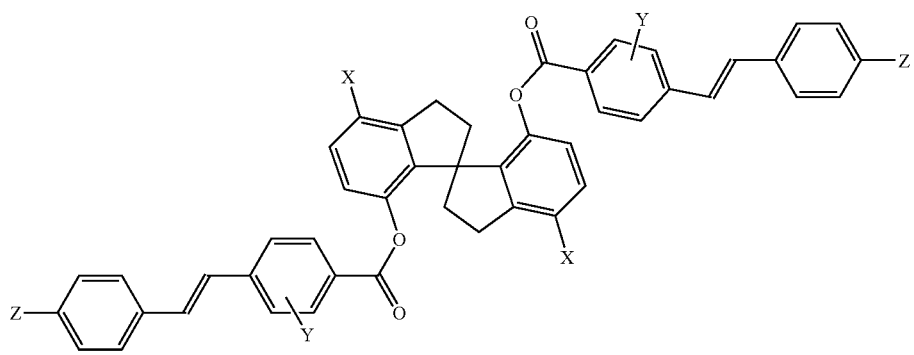

wherein Y's are independently hydrogen or any substituent.

In a preferred embodiment the Y's are independently the same as X.

In general, when reference in this application is made to a particular moiety or group it is to be understood that such reference encompasses that moiety whether unsubstituted or substituted with one or more substituents (up to the maximum possible number. For example, "alkyl" or "alkyl group" refers to substituted or unsubstituted alkyl, while "benzene group" refers to a substituted or unsubstituted benzene (with up to six substituents). Generally, unless otherwise specifically stated, substituent groups usable on molecules herein include any groups, whether substituted or unsubstituted, which do not destroy properties necessary for mesophase dopant utility. Examples of substituents on any of the mentioned groups can include known substituents, such as: chloro, fluoro, bromo, iodo; hydroxy; alkoxy, cyano, particularly those "lower alkyl" (that is, with 1 to 12 carbon atoms, for example, methoxy, ethoxy; substituted or unsubstituted alkyl, particularly lower alkyl (for example, methyl, trifluoromethyl); thioalkyl (for example, methylthio or ethylthio), particularly either of those with 1 to 12 carbon atoms; substituted or unsubstituted alkenyl, preferably of 2 to 12 carbon atoms (for example, ethenyl, propenyl, or butenyl); substituted and unsubstituted aryl, particularly those having from 6 to 20 carbon atoms (for example, phenyl); and substituted or unsubstituted heteroaryl, particularly those having a 5 or 6-membered ring containing 1 to 3 heteroatoms selected from N, O, or S (for example, pyridyl, thienyl, furyl, pyrrolyl); acid or acid salt groups; such groups as hydroxyl, amino, alkylamino, cyano, nitro, carboxy, carboxylate, acyl, alkoxycarbonyl, aminocarbonyl, sulfonamido, sulfamoyl, sulfo, sulfonate, or alkylammonium; and other groups known in the art. Alkyl substituents may specifically include "lower alkyl" (that is, having 1-12 carbon atoms), for example, methyl, ethyl, and the like. Further, with regard to any alkyl group or alkylene group, it will be understood that these can be branched or unbranched and include ring structures.

Several examples of compounds according to the present invention, which examples are merely illustrative and not intended to be limiting, are as follows:

I-1
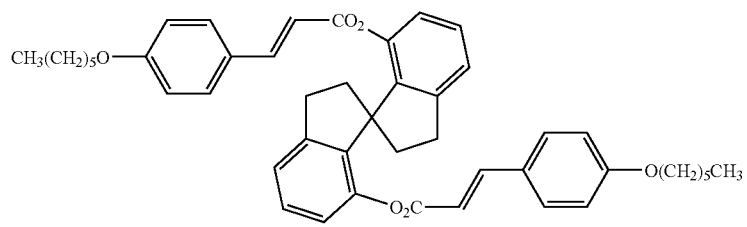

I-2
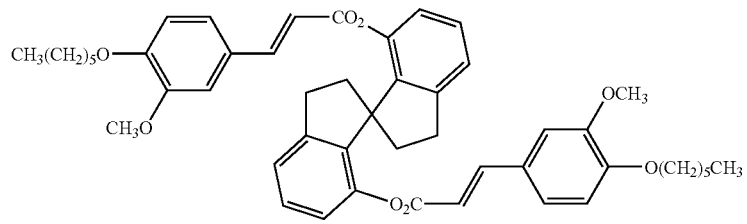

I-3
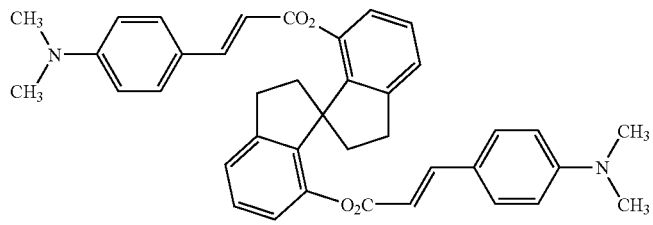

I-4
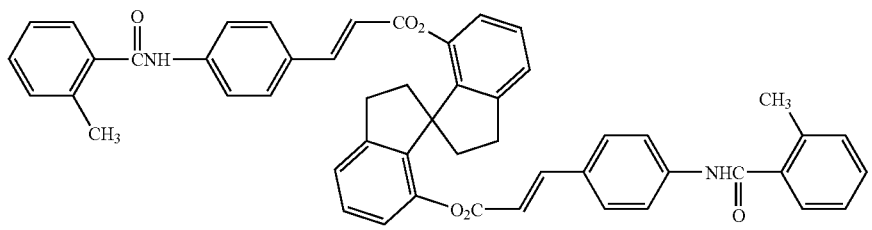

-continued
I-5
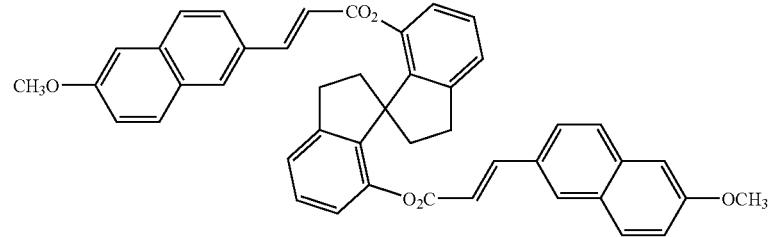
I-6
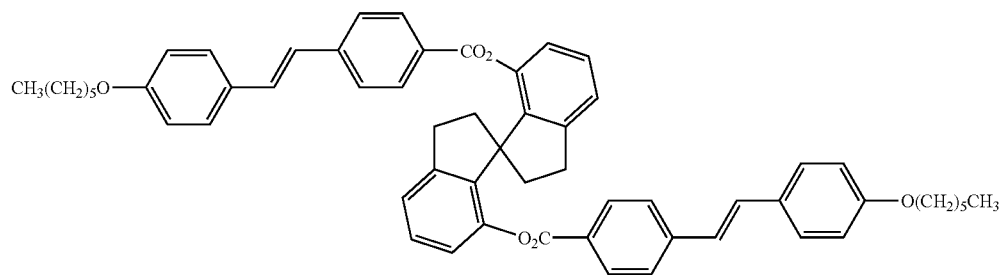
I-7
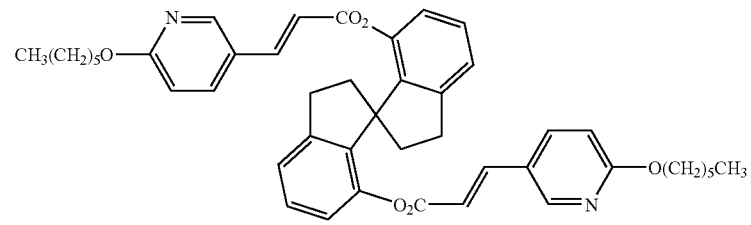
I-8
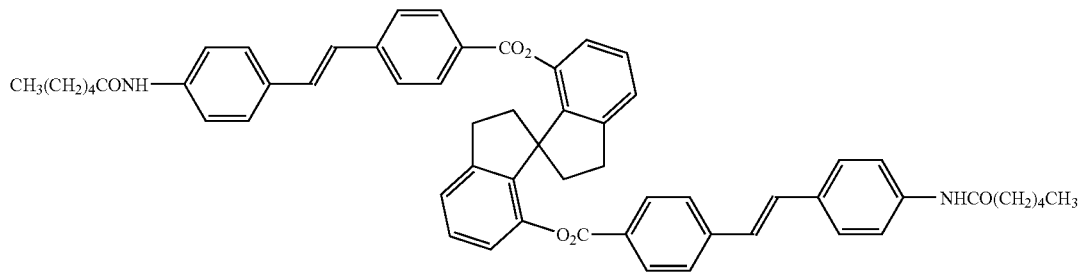
I-9
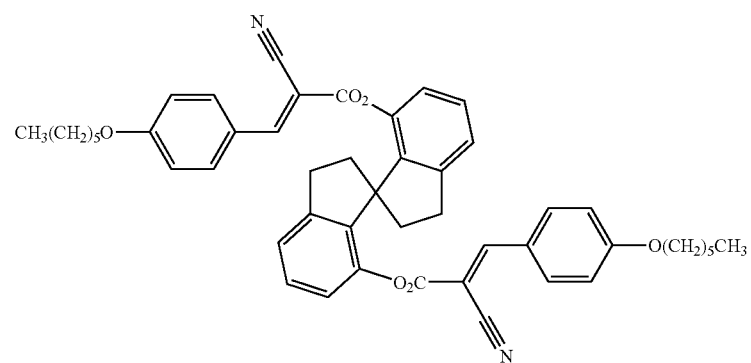

-continued
I-10
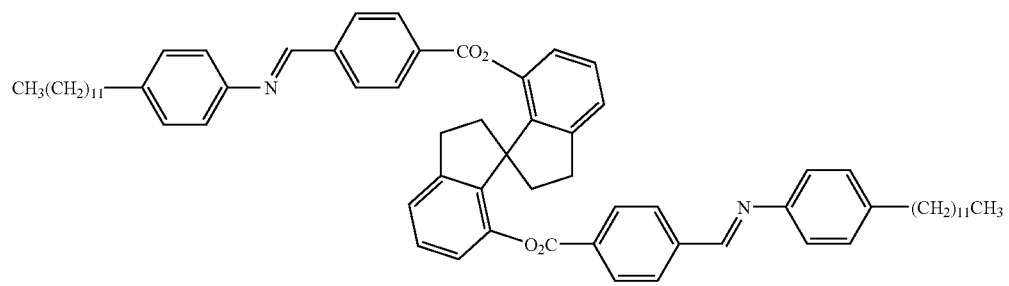
I-11
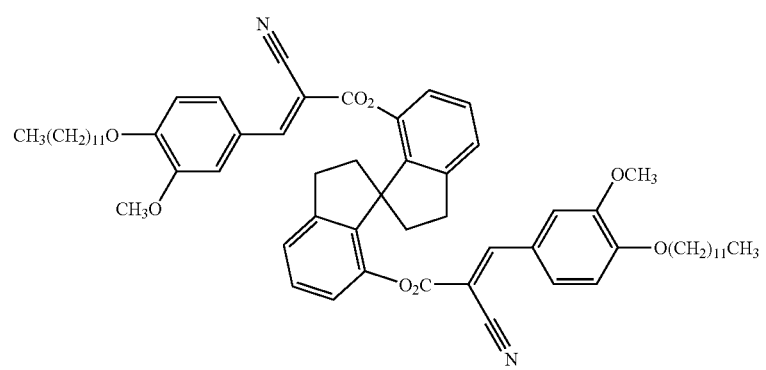
I-12
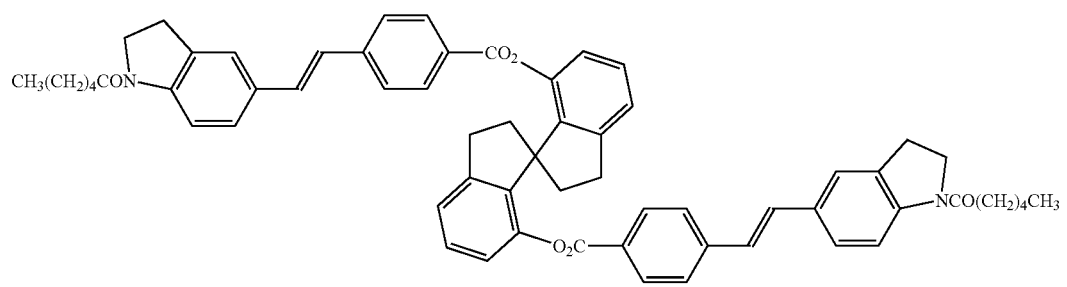
I-13
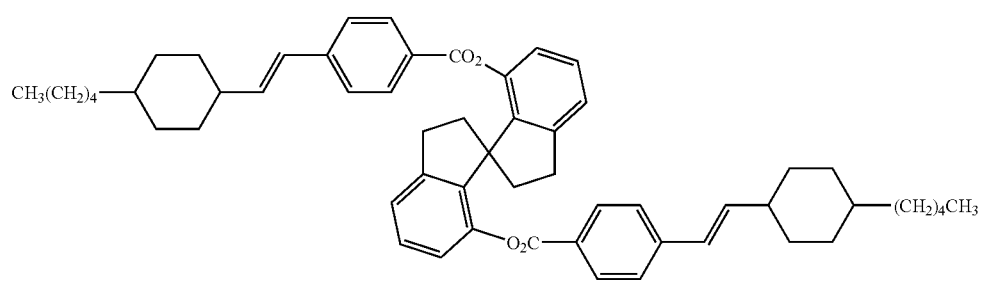
I-14
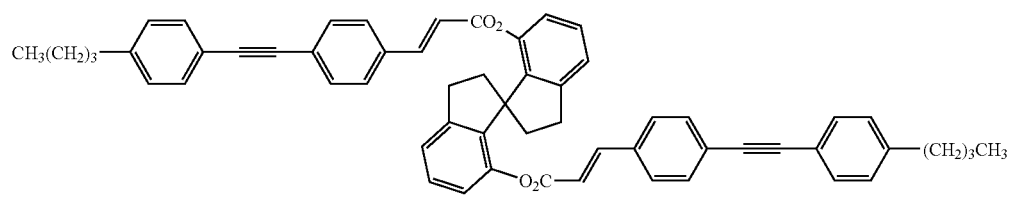

-continued
I-15
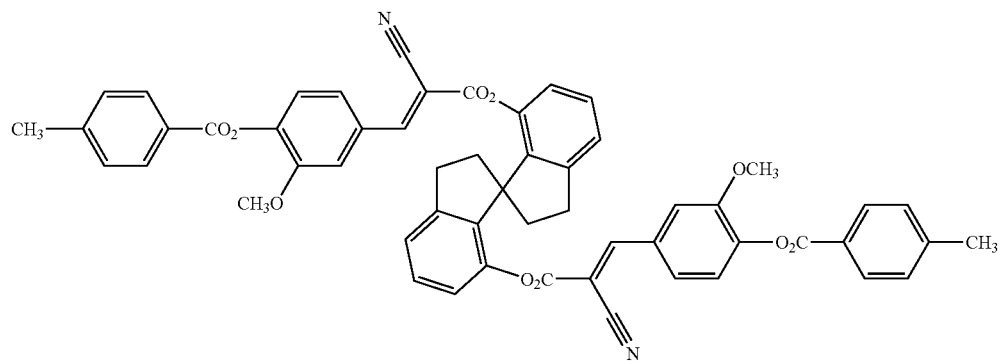
I-16
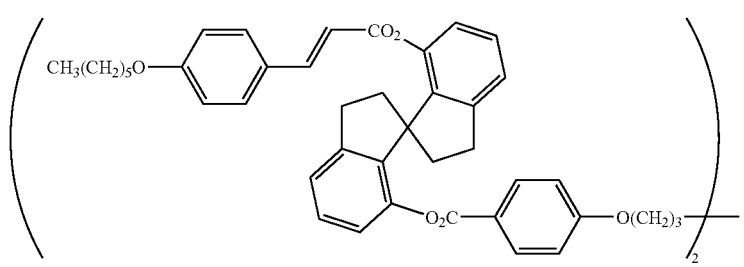
I-17
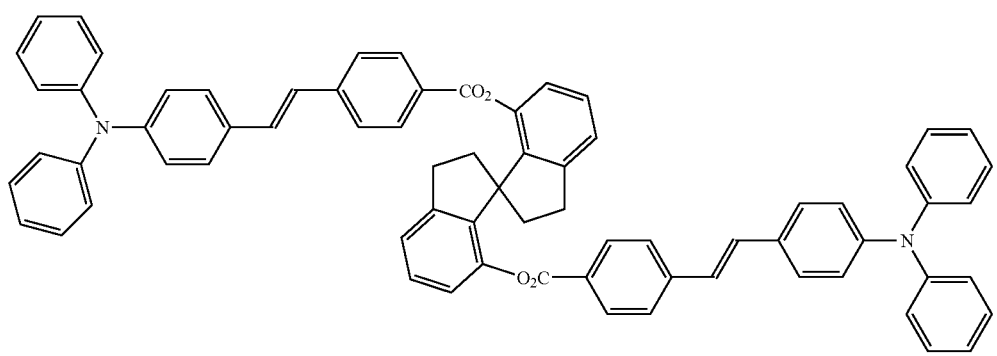
I-18
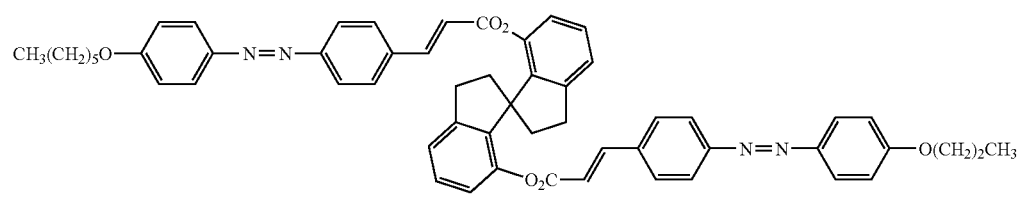
I-19
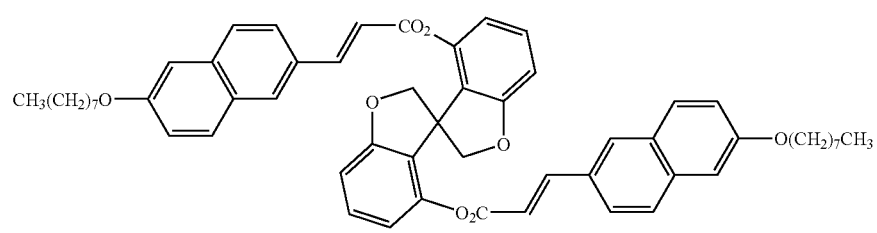
I-20
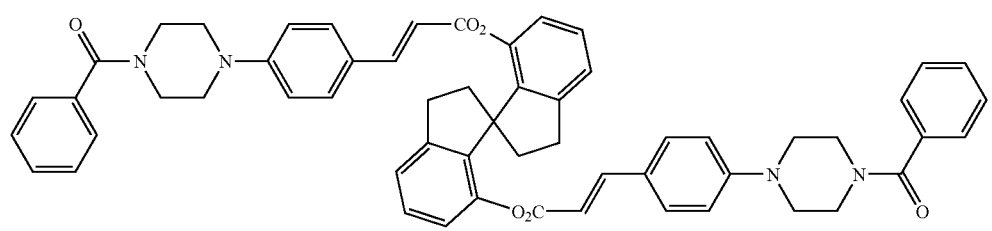

-continued
I-21
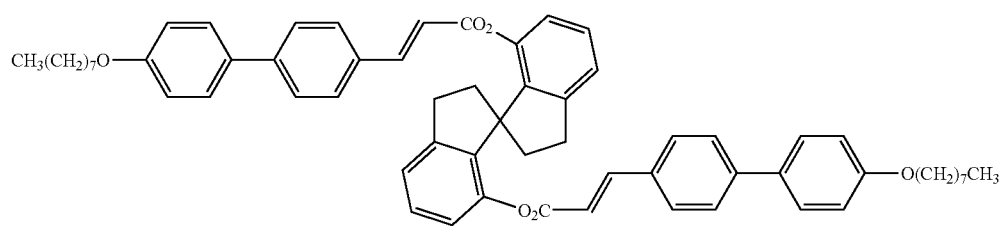
I-22
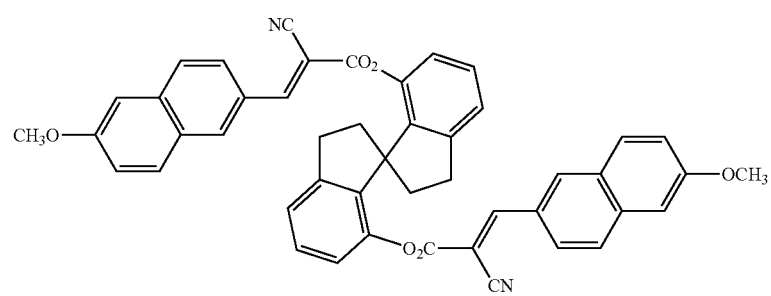
I-23
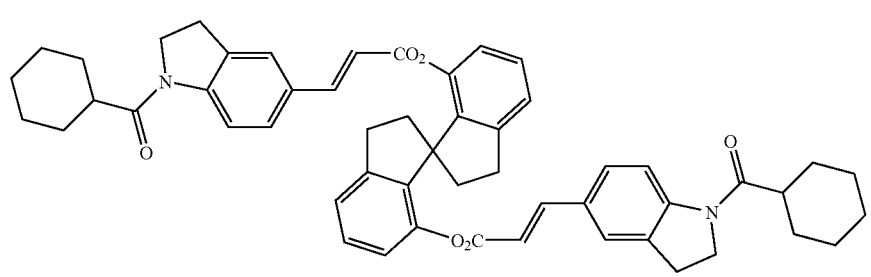
I-24
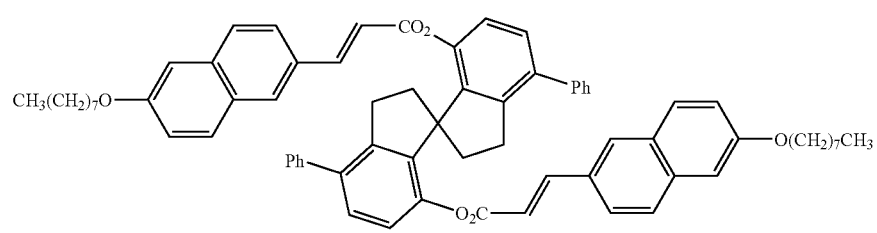
I-25
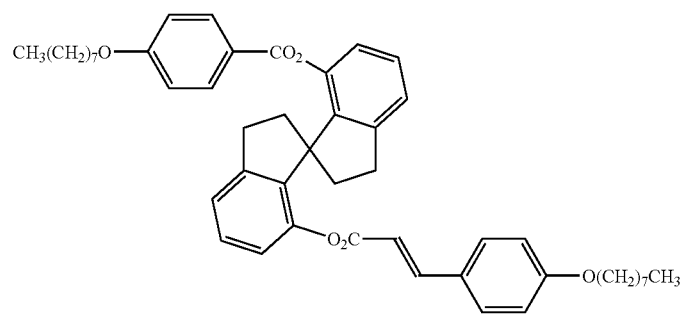
I-26
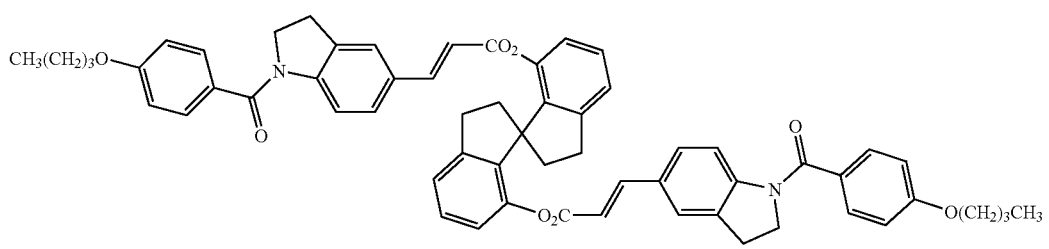

-continued
I-27
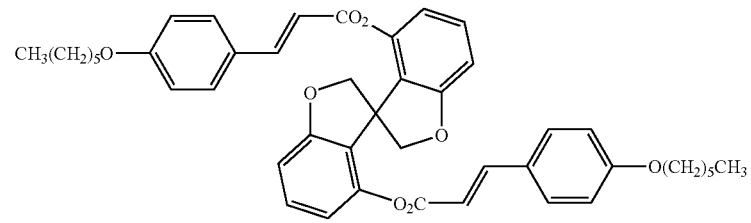
I-28
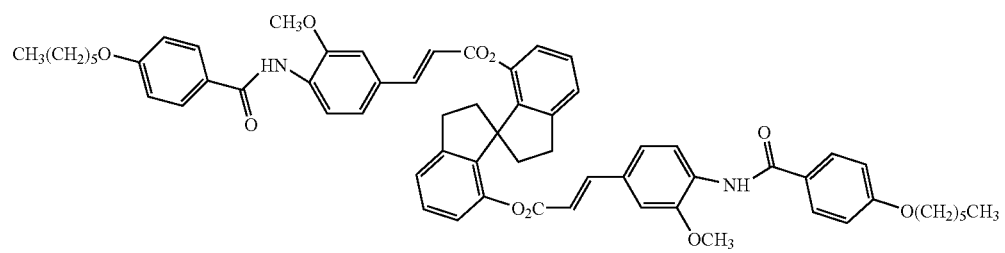
I-29
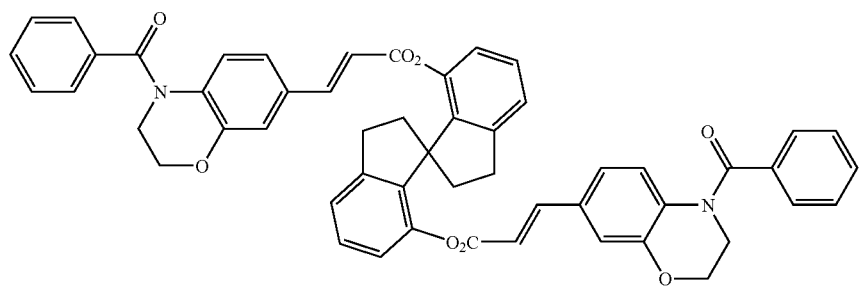
I-30
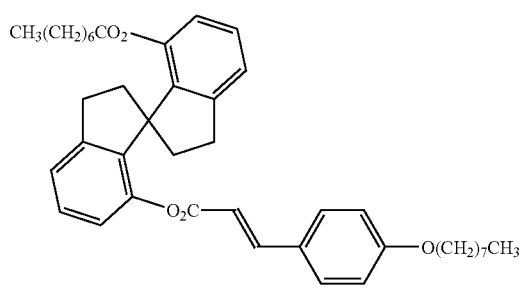
I-31
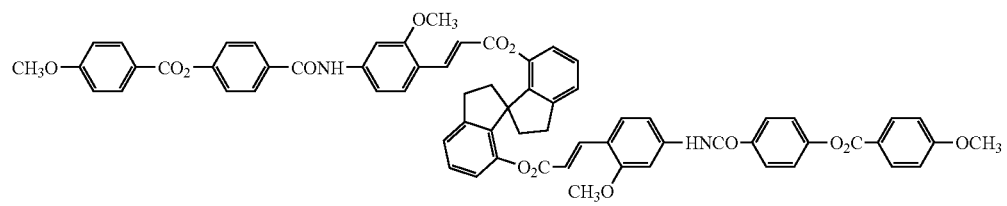
I-32
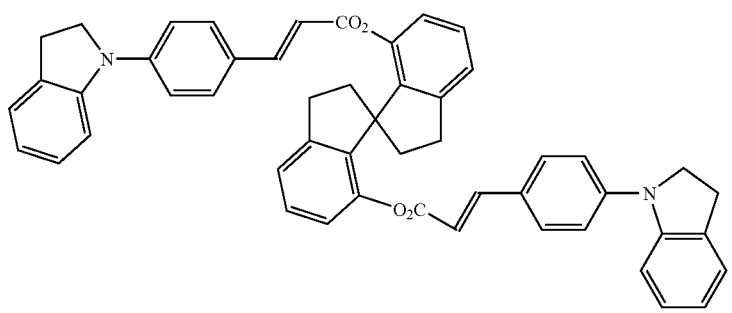

-continued
I-33
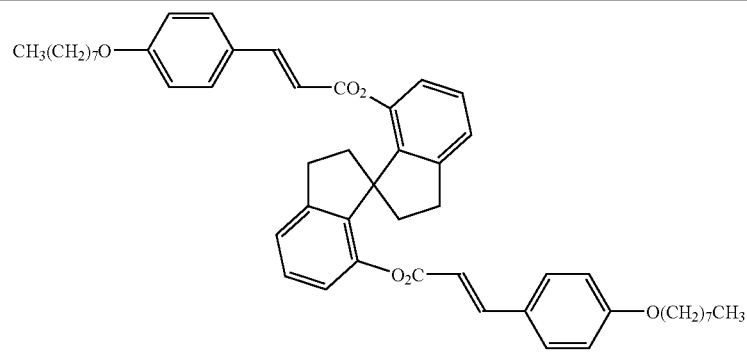
I-34
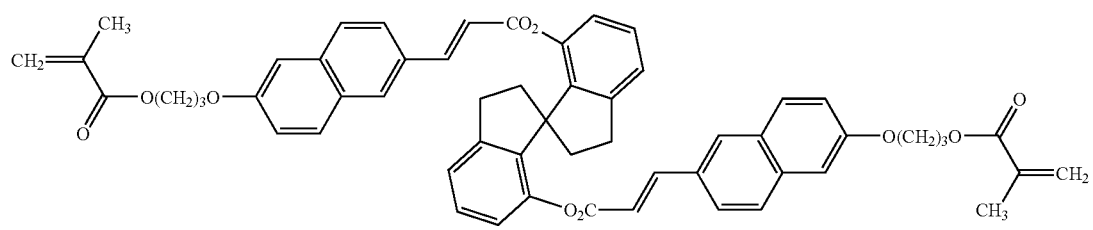
I-35
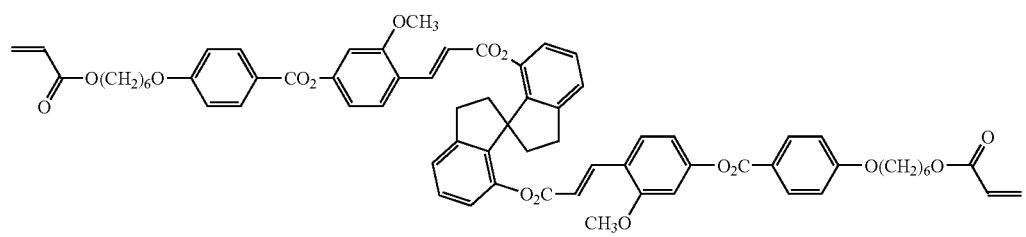
I-36
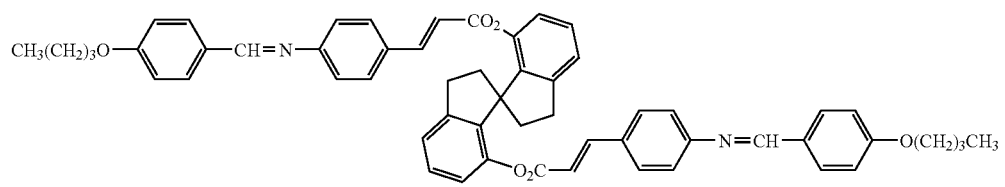
I-37
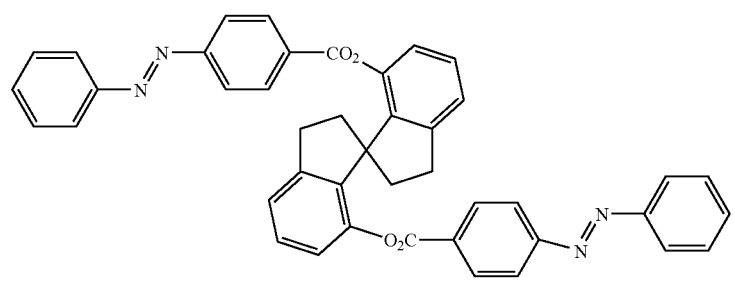
I-38
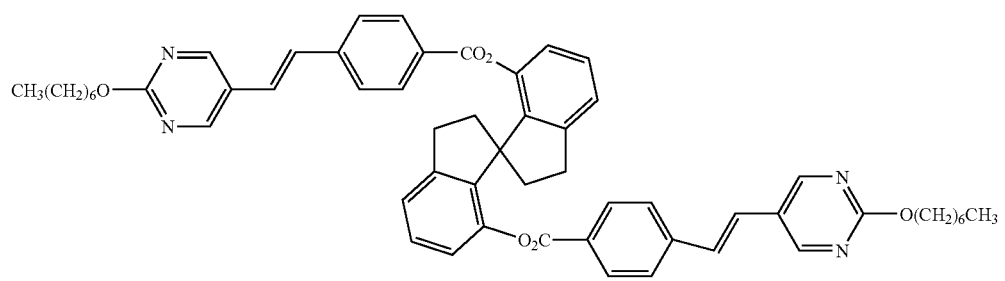

Compounds of the present invention, used in a non-racemic mixture or with an enantiomeric excess of one enantiomer, are useful as chiral dopants in liquid crystal compositions in an effective amount. One or more chiral dopants can be used cumulatively in an effective amount, either of Structure 1 or combined with other types of dopants. Suitably, the compound of Structure 1 can be used in the amount of 0.1 to 20 weight percent, based on the total weight of the liquid crystal composition, preferably 0.5 to 10 weight percent, more preferably 1 to 6 weight percent.

The concentration can be selected so that the desired interference hue is formed. Higher concentrations shift the hue into the blue region, and lower ones shift it into the red region.

Preferably the non-racemic dopant enantiomeric mixture comprises at least 60 (r≧0.2) weight percent of one of the enantiomers, based on the weight of both enantiomers, preferably at least 80 (r≧0.6) weight percent, more preferably greater than 90 (r≧0.8) weight percent. The enantiomeric excess is greater than 0, preferably greater than 0.6. Most preferably the non-racemic mixture is a substantially or essentially pure enantiomer with r≧0.9, corresponding to a weight percent ≧90%. As mentioned above, the more pure the enantiomer, the less chiral dopant necessary to obtain the desired HTP and, hence, less chance of incompatibilities or adversely affecting the desired anisotropic properties of the liquid crystal composition.

Preferably the HTP, on a dopant mole fraction basis, of the compound of Structure 1, when used in a particular liquid crystal composition, is greater than 80, more preferably at least 100, most preferably greater than 100.

Compounds of this invention can be readily prepared by those skilled in the art employing standard chemical transformations. Further these materials can be isolated in enantiomerically pure using standard methods including, but not limited to, chiral HPLC, chiral synthesis, chemical or chromatographic separation of chiral derivatives of the spirophenol, for example via diastereomeric esters, urethanes, carbonates, and the like.

The preparation of the spirophenol derivative of the following substructure 4 has been previously described.

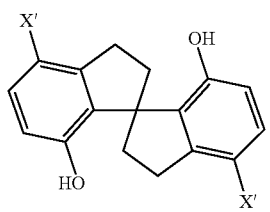

4

See S. Tan et al., Japanese Kokai (1994) JP 06308722 A2; Y. Kawabe et al., Japanese Kokai (1992) JP 04296755 A2; and T. Tanaka, M. Miyaguchi, R. Mochisuki, S. Tanaka, M. Okamoto, Y. Kitajima, and T. Miyazaki, *Heterocycles*, 25(1), 463-84(1987). See also V. Birman, A. Rheingold, and K-C. Lam, *Tetrahedron: Asymmetry*, 10(1), 125-131(1999). The preparative isolation of the enantiomerically pure derivatives has also been described. See, for example, J-H. Zhang, J. Liao, X. Cui, K-B. Yu, J. Zhu, J. G. Deng, S. F. Zhu, L. X. Wang, O. L. Zhou, L. W. Chung, and T. Ye, *Tetrahedron: Asymmetry*, 13(13), 1363-1366(2002). These and related methods may be employed to prepare enantiomerically enriched samples of the requisite spirophenols.

The use of chiral compounds of the present invention, or a polymerized form thereof, in admixture with a liquid crystal material, can be used for a wide variety of applications, including displays, polarizers, color filters, non-absorptive color filters, liquid crystal pigments for decorative or security purposes or coatings, optical switching, and optical information storage. For example, compositions according to the present invention can be used for making interference pigments with a viewing-angle-dependent color impression in printing inks and surface coatings. The compounds of the present invention can also be used in diagnostic, medical, or cosmetic compositions. For example, liquid crystal compositions in accordance with the present invention can be used to detect body temperature or to protect the human skin or hair from UV radiation.

Preferably, the liquid crystal mixture comprises 2 to 25 compounds, preferably 3 to 15 compounds. Particularly suitable liquid crystalline compositions are those in which the achiral liquid crystalline compounds comprise cyclic compounds, for example biphenyls, as will be appreciated by the skilled artisan.

Furthermore, the novel liquid crystalline compositions can be used for the preparation of liquid crystal displays. In one embodiment of a display, the liquid crystalline composition contains the chiral compound according to the present invention as a chiral dopant in liquid crystals. To this end, the compositions are, for example, applied to a substrate, preferably a polymeric film, if desired by knife coating or other physical influences. In another embodiment of a cholesteric liquid crystal composition containing the compounds according to the present invention may be dispersed in a polymeric matrix, disposed between electrodes as, for example, disclosed in U.S. Pat. No. 6,236,442 and U.S. Pat. No. 5,695,682, the disclosures of which are incorporated by reference.

As used herein, a "liquid crystal display" (LCD) is a type of panel display used in various electronic devices. At a minimum, an LCD comprises a substrate, at least one conductive layer and a liquid crystal layer. LCD's may also comprise two sheets of polarizing material with a liquid crystal solution between the polarizing sheets. The sheets of polarizing material may comprise a substrate of glass or transparent plastic. The LCD may also include functional layers. In one embodiment of an LCD, a transparent, multilayer flexible support is coated with a first conductive layer, which may be patterned, onto which is coated the light modulating liquid crystal layer. A second conductive layer is applied and overcoated with a dielectric layer to which dielectric conductive row contacts are attached, including vias that permit interconnection between conductive layers and the dielectric conductive row contacts. An optional nanopigmented functional layer may be applied between the liquid crystal layer and the second conductive layer.

The liquid crystal (LC) is used as an optical switch. The substrates are usually manufactured with transparent, conductive electrodes, in which electrical "driving" signals are coupled. The driving signals induce an electric field which can cause a phase change or state change in the liquid crystal material, the liquid crystal exhibiting different light reflecting characteristics according to its phase and/or state.

Liquid crystals can be nematic (N), chiral nematic (N*), or smectic, depending upon the arrangement of the molecules in the mesophase. Chiral nematic liquid crystal (N*LC) displays are typically reflective, that is, no backlight is needed, and can function without the use of polarizing films or a color filter.

The liquid crystalline composition can comprise STN, TN, chiral nematic, and ferroelectric materials or compounds.

Preferably, the material comprises one or more liquid crystal compounds forming a chiral nematic material. The composition can be coated on a substrate, for example, during the manufacture of a display comprising the coated substrate.

Chiral nematic liquid crystal refers to the type of liquid crystal having finer pitch than that of twisted nematic and super twisted nematic used in commonly encountered liquid crystal devices. Chiral nematic liquid crystals are so named because such liquid crystal formulations are commonly obtained by adding chiral agents to host nematic liquid crystals. Chiral nematic liquid crystals may be used to produce bistable or multistable displays. These devices have significantly reduced power consumption due to their nonvolatile "memory" characteristic. Since such displays do not require a continuous driving circuit to maintain an image, they consume significantly reduced power. Chiral nematic displays are bistable in the absence of a field; the two stable textures are the reflective planar texture and the weakly scattering focal conic texture. In the planar texture, the helical axes of the chiral nematic liquid crystal molecules are substantially perpendicular to the substrate upon which the liquid crystal is disposed. In the focal conic state the helical axes of the liquid crystal molecules are generally randomly oriented. Adjusting the concentration of chiral dopants in the chiral nematic material modulates the pitch length of the mesophase and, thus, the wavelength of radiation reflected. Chiral nematic materials that reflect infrared radiation and ultraviolet have been used for purposes of scientific study. Commercial displays are most often fabricated from chiral nematic materials that reflect visible light. Some known LCD devices include chemically etched, transparent, conductive layers overlying a glass substrate as described in U.S. Pat. No. 5,667,853, incorporated herein by reference.

In one embodiment, a chiral nematic liquid crystal composition may be dispersed in a continuous matrix. Such materials are referred to as "polymer dispersed liquid crystal" materials or "PDLC" materials. Such materials can be made by a variety of methods. For example, Doane et al. (*Applied Physics Letters,* 48, 269 (1986)) disclose a PDLC comprising approximately 0.4 μm droplets of nematic liquid crystal 5CB in a polymer binder. A phase separation method is used for preparing the PDLC. A solution containing monomer and liquid crystal is filled in a display cell and the material is then polymerized. Upon polymerization the liquid crystal becomes immiscible and nucleates to form droplets. West et al. (Applied Physics Letters 63, 1471 (1993)) disclose a PDLC comprising a chiral nematic mixture in a polymer binder. Once again a phase separation method is used for preparing the PDLC. The liquid crystal material and polymer (a hydroxy functionalized polymethylmethacrylate) along with a crosslinker for the polymer are dissolved in a common organic solvent toluene and coated on an indium tin oxide (ITO) substrate. A dispersion of the liquid crystal material in the polymer binder is formed upon evaporation of toluene at high temperature. The phase separation methods of Doane et al. and West et al. require the use of organic solvents that may be objectionable in certain manufacturing environments.

The contrast of the display is degraded if there is more than a substantial monolayer of N*LC domains. The term "substantial monolayer" is defined by the Applicants to mean that, in a direction perpendicular to the plane of the display, there is no more than a single layer of domains sandwiched between the electrodes at most points of the display (or the imaging layer), preferably at 75 percent or more of the points (or area) of the display, most preferably at 90 percent or more of the points (or area) of the display. In other words, at most, only a minor portion (preferably less than 10 percent) of the points (or area) of the display has more than a single domain (two or more domains) between the electrodes in a direction perpendicular to the plane of the display, compared to the amount of points (or area) of the display at which there is only a single domain between the electrodes.

The amount of material needed for a monolayer can be accurately determined by calculation based on individual domain size, assuming a fully closed packed arrangement of domains. (In practice, there may be imperfections in which gaps occur and some unevenness due to overlapping droplets or domains.) On this basis, the calculated amount is preferably less than about 150 percent of the amount needed for monolayer domain coverage, preferably not more than about 125 percent of the amount needed for a monolayer domain coverage, more preferably not more than 110 percent of the amount needed for a monolayer of domains. Furthermore, improved viewing angle and broadband features may be obtained by appropriate choice of differently doped domains based on the geometry of the coated droplet and the Bragg reflection condition.

In a preferred embodiment of the invention, the display device or display sheet has simply a single imaging layer of liquid crystal material along a line perpendicular to the face of the display, preferably a single layer coated on a flexible substrate. Such as structure, as compared to vertically stacked imaging layers each between opposing substrates, is especially advantageous for monochrome shelf labels and the like. Structures having stacked imaging layers, however, are optional for providing additional advantages in some case.

Preferably, the domains are flattened spheres and have on average a thickness substantially less than their length, preferably at least 50% less. More preferably, the domains on average have a thickness (depth) to length ratio of 1:2 to 1:6. The flattening of the domains can be achieved by proper formulation and sufficiently rapid drying of the coating. The domains preferably have an average diameter of 2 to 30 microns. The imaging layer preferably has a thickness of 10 to 150 microns when first coated and 2 to 20 microns when dried.

The flattened domains of liquid crystal material can be defined as having a major axis and a minor axis. In a preferred embodiment of a display or display sheet, the major axis is larger in size than the cell (or imaging layer) thickness for a majority of the domains. Such a dimensional relationship is shown in U.S. Pat. No. 6,061,107, hereby incorporated by reference in its entirety.

Modem chiral nematic liquid crystal materials usually include at least one nematic host combined with a chiral dopant. In general, the nematic liquid crystal phase is composed of one or more mesogenic components combined to provide useful composite properties. Many such materials are available commercially. The nematic component of the chiral nematic liquid crystal mixture may be comprised of any suitable nematic liquid crystal mixture or composition having appropriate liquid crystal characteristics. Nematic liquid crystals suitable for use in the present invention are preferably composed of compounds of low molecular weight selected from nematic or nematogenic substances, for example from the known classes of the azoxybenzenes, benzylideneanilines, biphenyls, terphenyls, phenyl or cyclohexyl benzoates, phenyl or cyclohexyl esters of cyclohexanecarboxylic acid; phenyl or cyclohexyl esters of cyclohexylbenzoic acid; phenyl or cyclohexyl esters of cyclohexylcyclohexanecarboxylic acid; cyclohexylphenyl esters of benzoic acid, of cyclohexanecarboxyiic acid and of cyclohexylcyclohexanecarboxylic acid; phenyl cyclohexanes; cyclohexyibiphenyls; phenyl cyclohexylcyclohexanes; cyclohexylcyclohexanes; cyclohexylcyclohexenes; cyclohexylcyclohexylcyclohexenes; 1,4-bis-cyclohexylbenzenes; 4,4-bis-cyclohexylbiphenyls; phenyl- or cyclohexylpyrimidines; phenyl- or cyclohexylpyridines; phenyl- or cyclohexylpyridazines; phenyl- or cyclohexyidioxanes; phenyl- or cyclohexyl-1,3-dithianes; 1,2-diphenylethanes; 1,2-dicyclohexylethanes; 1-phenyl-2-cyclohexylethanes; 1-cyclohexyl-2-(4-phenylcyclohexyl)ethanes; 1-cyclohexyl-2',2-biphenylethanes; 1-phenyl-2-cyclohexylphenylethanes; optionally halogenated stilbenes; benzyl phenyl ethers; tolanes; substituted cinnamic acids and esters; and further classes of nematic or nematogenic substances. The 1,4-phenylene groups in these compounds may also be laterally mono- or difluorinated. The liquid crystalline material of this preferred embodiment is based on the achiral compounds of this type. The most important compounds, that are possible as components of these liquid crystalline materials, can be characterized by the following formula R'—X—Y-Z-R" wherein X and Z, which may be identical or different, are in each case, independently from one another, a bivalent radical from the group formed by -Phe-, -Cyc-, -Phe-Phe-, -Phe-Cyc-, -Cyc-Cyc-, -Pyr-, -Dio-, -B-Phe- and -B-Cyc-; wherein Phe is unsubstituted or fluorine substituted 1,4-phenylene, Cyc is trans-1,4-cyclohexylene or 1,4-cyclohexenylene, Pyr is pyrimidine-2,5-diyl or pyridine-2,5-diyl, Dio is 1,3-dioxane-2,5-diyl, and B is 2-(trans-1,4-cyclohexyl)ethyl, pyrimidine-2,5-diyl, pyridine-2,5-diyl or 1,3-dioxane-2,5-diyl. Y in these compounds is selected from the following bivalent groups —CH=CH—, —C≡C—, —N=N(O)—, —CH=CY'—, —CH=N(O)—, —CH2-CH2-, —CO—O—, —CH2-O—, —CO—S—, —CH2-S—, —COO-Phe-COO— or a single bond, with Y' being halogen, preferably chlorine, or —CN; R' and R" are, in each case, independently of one another, alkyl, alkenyl, alkoxy, alkenyloxy, alkanoyloxy, alkoxycarbonyl or alkoxycarbonyloxy with 1 to 18, preferably 1 to 12 C atoms, or alternatively one of R' and R" is —F, —CF3, —OCF3, —Cl, —NCS or —CN. In most of these compounds R' and R' are, in each case, independently of each another, alkyl, alkenyl or alkoxy with different chain length, wherein the sum of C atoms in nematic media generally is between 2 and 9, preferably between 2 and 7. The nematic liquid crystal phases typically consist of 2 to 20, preferably 2 to 15 components. Optionally, such nematic compositions may be polymerizable. The above list of materials is not intended to be exhaustive or limiting. The lists disclose a variety of representative materials suitable for use or mixtures, which comprise the active element in electro-optic liquid crystal compositions.

Suitable chiral nematic liquid crystal compositions preferably have a positive dielectric anisotropy and include chiral material in an amount effective to form focal conic and twisted planar textures. Chiral nematic liquid crystal materials are preferred because of their excellent reflective characteristics, bistability and gray scale memory. The chiral nematic liquid crystal is typically a mixture of nematic liquid crystal and chiral material in an amount sufficient to produce the desired pitch length. Suitable commercial nematic liquid crystals include, for example, E7, E44, E48, E31, E80 BL087 BL101, ZLI-3308, ZLI-3273, ZLI-5048-000, ZLI-5049-100, ZLI-5100-100, ZLI-5800-000, MLC-6041-100. TL202, TL203, TL204 and TL205 manufactured by E. Merck (Darmstadt, Germany). Although nematic liquid crystals having positive dielectric anisotropy, and especially cyanobiphenyls, are preferred, virtually any nematic liquid crystal known in the art, including those having negative dielectric anisotropy should be suitable for use in the invention. Other nematic materials may also be suitable for use in the present invention as would be appreciated by those skilled in the art.

The chiral dopant added to the nematic mixture to induce the helical twisting of the mesophase, thereby allowing reflection of visible light, can be of any useful structural class. The choice of dopant depends upon several characteristics including among others its chemical compatibility with the nematic host, helical twisting power, temperature sensitivity, and light fastness. Many chiral dopant classes are known in the art: e.g., G. Gottarelli and G. Spada, Mol. Cryst. Liq. Crys., 123, 377 (1985); G. Spada and G. Proni, Enantiomer, 3, 301 (1998) and references therein. Typical well known dopant classes include 1,1-binaphthol derivatives; isosorbide (D-1) and similar isomannide esters as disclosed in U.S. Pat. No. 6,217,792; TADDOL derivatives (D-2) as disclosed in U.S. Pat. No. 6,099,751; and the pending spiroindanes esters (D-3) as disclosed in U.S. patent application Ser. No. 10/651,692 by T. Welter et al., filed Aug. 29, 2003, titled "Chiral Compounds And Compositions Containing The Same," which issued on May 30, 2006 as U.S. Pat. No. 7,052,743 and is hereby incorporated by reference.

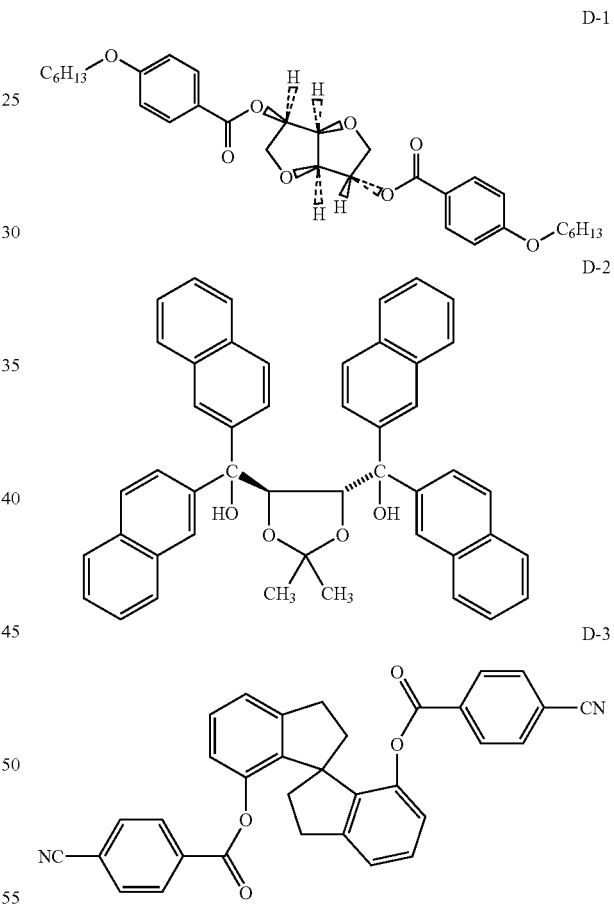

The pitch length of the liquid crystal materials may be adjusted based upon the following equation (1):

$$\lambda_{max} = n_{av} p_0$$

where $\lambda_{max}$ is the peak reflection wavelength, that is, the wavelength at which reflectance is a maximum, $n_{av}$ is the average index of refraction of the liquid crystal material, and $p0$ is the natural pitch length of the chiral nematic helix. Definitions of chiral nematic helix and pitch length and methods of its measurement, are known to those skilled in the art such as can be found in the book, Blinov, L. M., Electro-optical and Magneto-Optical Properties of Liquid Crystals, John Wiley & Sons Ltd. 1983. The pitch length is modified by adjusting the concentration of the chiral material in the liquid crystal material. For most concentrations of chiral dopants, the pitch length induced by the dopant is inversely proportional to the concentration of the dopant. The proportionality constant is given by the following equation (2):

$$p_0 = 1/(HTP.c)$$

where c is the concentration of the chiral dopant and HTP (as termed β in some references) is the proportionality constant.

For some applications, it is desired to have liquid crystal mixtures that exhibit a strong helical twist and thereby a short pitch length. For example in liquid crystalline mixtures that are used in selectively reflecting chiral nematic displays, the pitch has to be selected such that the maximum of the wavelength reflected by the chiral nematic helix is in the range of visible light. Other possible applications are polymer films with a chiral liquid crystalline phase for optical elements, such as chiral nematic broadband polarizers or reflectors, filter arrays, or chiral liquid crystalline retardation films. Among these are active and passive optical elements or color filters and liquid crystal displays, for example STN, TN, AMD-TN, temperature compensation, polymer free or polymer stabilized chiral nematic texture (PFCT, PSCT) displays. Possible display industry applications include ultralight, flexible, and inexpensive displays for notebook and desktop computers, instrument panels, video game machines, videophones, mobile phones, hand held PCs, PDAs, e-books, camcorders, satellite navigation systems, store and supermarket pricing systems, highway signs, informational displays, smart cards, toys, and other electronic devices.

Chiral nematic liquid crystal materials and cells, as well as polymer stabilized chiral nematic liquid crystals and cells, are well known in the art and described in, for example, U.S. application Ser. No. 07/969,093 by Doane et al. filed Oct. 30, 1992 issued Aug. 1, 1995 as U.S. Pat. No. 5,437,811 and Ser. No. 08/057,662 by West et al., filed May 4, 1993, issued Sep. 26, 1995 as U.S. Pat. No. 5,453,863; Yang et al., Appl. Phys. Len. 60(25) pp 3102-04 (1992); Yang et al., J. Appl. Phys. 76(2) pp 1331 (1994); published International Patent Application No. PCT/US92/09367; and published International Patent Application No. PCT/US92/03504 All of which are incorporated herein by reference.

Carriers

In a preferred embodiment, a light modulating layer is deposited over a first conductor. The light modulating layer contains a chiral nematic liquid crystal. The selected material preferably exhibits high optical and electrical anisotropy and matches the index of refraction of the carrier polymer, when the material is electrically oriented. Examples of such materials are E. Merck's BL-03 BL-048 or BL-033, which are available from EM Industries of Hawthorne, N.Y. Other light reflecting or diffusing modulating, electrically operated materials can also be coated, such as a micro-encapsulated electrophoretic material in oil.

The liquid crystal can be a chiral doped nematic liquid crystal, also known as cholesteric liquid crystal, such as those disclosed in U.S. Pat. No. 5,695,682. Application of fields of various intensity and duration change the state of chiral doped nematic materials from a reflective to a transmissive state. These materials have the advantage of maintaining a given state indefinitely after the field is removed. Cholesteric liquid crystal materials can be Merck BL112, BL118 or BL126 that are available from EM Industries of Hawthorne, N.Y. The light modulating layer is effective in two conditions.

The flexible plastic substrate can be any flexible self-supporting plastic film that supports the thin conductive metallic film. "Plastic" means a high polymer, usually made from polymeric synthetic resins, which may be combined with other ingredients, such as curatives, fillers, reinforcing agents, colorants, and plasticizers. Plastic includes thermoplastic materials and thermosetting materials.

The flexible plastic film must have sufficient thickness and mechanical integrity so as to be self-supporting, yet should not be so thick as to be rigid. Typically, the flexible plastic substrate is the thickest layer of the composite film in thickness. Consequently, the substrate determines to a large extent the mechanical and thermal stability of the fully structured composite film.

Another significant characteristic of the flexible plastic substrate material is its glass transition temperature (Tg). Tg is defined as the glass transition temperature at which plastic material will change from the glassy state to the rubbery state. It may comprise a range before the material may actually flow. Suitable materials for the flexible plastic substrate include thermoplastics of a relatively low glass transition temperature, for example up to 150° C., as well as materials of a higher glass transition temperature, for example, above 150° C. The choice of material for the flexible plastic substrate would depend on factors such as manufacturing process conditions, such as deposition temperature, and annealing temperature, as well as post-manufacturing conditions such as in a process line of a displays manufacturer. Certain of the plastic substrates discussed below can withstand higher processing temperatures of up to at least about 200 ° C., some up to 300°-350° C., without damage.

Typically, the flexible plastic substrate is polyethylene terephthalate (PET), polyethylene naphthalate (PEN), polyethersulfone (PES), polycarbonate (PC), polysulfone, a phenolic resin, an epoxy resin, polyester, polyimide, polyetherester, polyetheramide, cellulose acetate, aliphatic polyurethanes, polyacrylonitrile, polytetrafluoroethylenes, polyvinylidene fluorides, poly(methyl (x-methacrylates), an aliphatic or cyclic polyolefin, polyarylate (PAR), polyetherimide (PEI), polyethersulphone (PES), polyimide (PI), Teflon poly(perfluoro-alboxy) fluoropolymer (PFA), poly(ether ether ketone) (PEEK), poly(ether ketone) (PEK), poly(ethylene tetrafluoroethylene)fluoropolymer (PETFE), and poly (methyl methacrylate) and various acrylate/methacrylate copolymers (PMMA). Aliphatic polyolefins may include high density polyethylene (HDPE), low density polyethylene (LDPE), and polypropylene, including oriented polypropylene (OPP). Cyclic polyolefins may include poly(bis(cyclopentadiene)). A preferred flexible plastic substrate is a cyclic polyolefin or a polyester. Various cyclic polyolefins are suitable for the flexible plastic substrate. Examples include Arton® made by Japan Synthetic Rubber Co., Tokyo, Japan; Zeanor T made by Zeon Chemicals L.P., Tokyo Japan; and Topas® made by Celanese A. G., Kronberg Germany. Arton is a poly(bis(cyclopentadiene)) condensate that is a film of a polymer. Alternatively, the flexible plastic substrate can be a polyester. A preferred polyester is an aromatic polyester such as Arylite. Although various examples of plastic substrates are set forth above, it should be appreciated that the substrate can also be formed from other materials such as glass and quartz.

The flexible plastic substrate can be reinforced with a hard coating. Typically, the hard coating is an acrylic coating. Such a hard coating typically has a thickness of from 1 to 15 microns, preferably from 2 to 4 microns and can be provided by free radical polymerization, initiated either thermally or by ultraviolet radiation, of an appropriate polymerizable material. Depending on the substrate, different hard coatings can be used. When the substrate is polyester or Arton, a particularly preferred hard coating is the coating known as "Lintec." Lintec contains UV cured polyester acrylate and colloidal silica. When deposited on Arton, it has a surface composition of 35 Atom % C, 45 Atom % 0 and 20 Atom % Si, excluding hydrogen. Another particularly preferred hard coating is the acrylic coating sold under the trademark "Terrapin" by Tekra Corporation, New Berlin, Wis.

In one embodiment, a sheet supports a conventional polymer dispersed light modulating material. The sheet includes a substrate. The substrate may be made of a polymeric material, such as Kodak Estar film base formed of polyester plastic, and have a thickness of between 20 and 200 microns. For example, the substrate may be an 80 micron thick sheet of transparent polyester. Other polymers, such as transparent polycarbonate, can also be used. Alternatively, the substrate 15 may be thin, transparent glass.

The LCD contains at least one conductive layer, which typically is comprised of a primary metal oxide. This conductive layer may comprise other metal oxides such as indium oxide, titanium dioxide, cadmium oxide, gallium indium oxide, niobium pentoxide and tin dioxide. See, Int. Publ. No. WO 99/36261 By Polaroid Corporation. In addition to the primary oxide such as ITO, the at least one conductive layer can also comprise a secondary metal oxide such as an oxide of cerium, titanium, zirconium, hafnium and/or tantalum. See, U.S. Pat. No. 5,667,853 to Fukuyoshi et al. (Toppan Printing Co.) Other transparent conductive oxides include, but are not limited to $ZnO_2$, $Zn_2SnO_4$, $Cd_2SnO_4$, $Zn_2In_2O_5$, $MgIn_2O_4$, $Ga_2O_3$—$In_2O_3$, or $TaO_3$. The conductive layer may be formed, for example, by a low temperature sputtering technique or by a direct current sputtering technique, such as DC-sputtering or RF-DC sputtering, depending upon the material or materials of the underlying layer. The conductive layer may be a transparent, electrically conductive layer of tin oxide or indium tin oxide (ITO), or polythiophene, with ITO being the preferred material. Typically, the conductive layer is sputtered onto the substrate to a resistance of less than 250 ohms per square. Alternatively, conductive layer may be an opaque electrical conductor formed of metal such as copper, aluminum or nickel. If the conductive layer is an opaque metal, the metal can be a metal oxide to create a light absorbing conductive layer.

Indium tin oxide (ITO) is the preferred conductive material, as it is a cost effective conductor with good environmental stability, up to 90% transmission, and down to 20 ohms per square resistivity. An exemplary preferred ITO layer has a % T greater than or equal to 80% in the visible region of light, that is, from greater than 400 nm to 700 nm, so that the film will be useful for display applications. In a preferred embodiment, the conductive layer comprises a layer of low temperature ITO which is polycrystalline. The ITO layer is preferably 10-120 nm in thickness, or 50-100 nm thick to achieve a resistivity of 20-60 ohms/square on plastic. An exemplary preferred ITO layer is 60-80 nm thick.

The conductive layer is preferably patterned. The conductive layer is preferably patterned into a plurality of electrodes. The patterned electrodes may be used to form a LCD device. In another embodiment, two conductive substrates are positioned facing each other and cholesteric liquid crystals are positioned therebetween to form a device. The patterned ITO conductive layer may have a variety of dimensions. Exemplary dimensions may include line widths of 10 microns, distances between lines, that is, electrode widths, of 200 microns, depth of cut, that is, thickness of ITO conductor, of 100 nanometers. ITO thicknesses on the order of 60, 70 and greater than 100 nanometers are also possible.

The display may also contain a second conductive layer applied to the surface of the light modulating layer. The second conductive layer desirably has sufficient conductivity to carry a field across the light modulating layer. The second conductive layer may be formed in a vacuum environment using materials such as aluminum, tin, silver, platinum, carbon, tungsten, molybdenum, or indium. Oxides of these metals can be used to darken patternable conductive layers. The metal material can be excited by energy from resistance heating, cathodic arc, electron beam, sputtering or magnetron excitation. The second conductive layer may comprise coatings of tin oxide or indium tin oxide, resulting in the layer being transparent. Alternatively, second conductive layer may be printed conductive ink.

For higher conductivities, the second conductive layer may comprise a silver based layer which contains silver only or silver containing a different element such as aluminum (Al), copper (Cu), nickel (Ni), cadmium (Cd), gold (Au), zinc (Zn), magnesium (Mg), tin (Sn), indium (In), tantalum (Ta), titanium (Ti), zirconium (Zr), cerium (Ce), silicon (Si), lead (Pb) or palladium (Pd). In a preferred embodiment, the conductive layer comprises at least one of gold, silver and a gold/silver alloy, for example, a layer of silver coated on one or both sides with a thinner layer of gold. See, Int. Publ. No. WO 99/36261 By Polaroid Corporation. In another embodiment, the conductive layer may comprise a layer of silver alloy, for example, a layer of silver coated on one or both sides with a layer of indium cerium oxide (InCeO). See U.S. Pat. No. 5,667,853, incorporated herein in by reference.

The second conductive layer may be patterned irradiating the multilayered conductor/substrate structure with ultraviolet radiation so that portions of the conductive layer are ablated therefrom. It is also known to employ an infrared (IR) fiber laser for patterning a metallic conductive layer overlying a plastic film, directly ablating the conductive layer by scanning a pattern over the conductor/film structure. See: Int. Publ. No. WO 99/36261 and "42.2: A New Conductor Structure for Plastic LCD Applications Utilizing 'All Dry' Digital Laser Patterning," 1998 SID International Symposium Digest of Technical Papers, Anaheim, Calif., May 17-22, 1998, no. VOL. 29, May 17, 1998, pages 1099-1101, both incorporated herein by reference.

The LCD may also comprises at least one "functional layer" between the conductive layer and the substrate. The functional layer may comprise a protective layer or a barrier layer. The protective layer useful in the practice of the invention can be applied in any of a number of well known techniques, such as dip coating, rod coating, blade coating, air knife coating, gravure coating and reverse roll coating, extrusion coating, slide coating, curtain coating, and the like. The liquid crystal particles and the binder are preferably mixed together in a liquid medium to form a coating composition. The liquid medium may be a medium such as water or other aqueous solutions in which the hydrophilic colloid are dispersed with or without the presence of surfactants. A preferred barrier layer may acts as a gas barrier or a moisture barrier and may comprise SiOx, AlOx or ITO. The protective layer, for example, an acrylic hard coat, functions to prevent laser light from penetrating to functional layers between the protective layer and the substrate, thereby protecting both the barrier layer and the substrate. The functional layer may also serve as an adhesion promoter of the conductive layer to the substrate.

In another embodiment, the polymeric support may further comprise an antistatic layer to manage unwanted charge build up on the sheet or web during roll conveyance or sheet finishing. In another embodiment of this invention, the antistatic layer has a surface resistivity of between $10^5$ to $10^{12}$. Above $10^{12}$, the antistatic layer typically does not provide sufficient conduction of charge to prevent charge accumulation to the point of preventing fog in photographic systems or from unwanted point switching in liquid crystal displays. While layers greater than $10^5$ will prevent charge buildup, most antistatic materials are inherently not that conductive and in those materials that are more conductive than $10^5$, there is usually some color associated with them that will reduce the overall transmission properties of the display. The antistatic layer is separate from the highly conductive layer of ITO and provides the best static control when it is on the opposite side of the web substrate from that of the ITO layer. This may include the web substrate itself.

Another type of functional layer may be a color contrast layer. Color contrast layers may be radiation reflective layers or radiation absorbing layers. In some cases, the rearmost substrate of each display may preferably be painted black. The color contrast layer may also be other colors. In another embodiment, the dark layer comprises milled nonconductive pigments. The materials are milled below 1 micron to form "nano-pigments". In a preferred embodiment, the dark layer absorbs all wavelengths of light across the visible light spectrum, that is from 400 nanometers to 700 nanometers wavelength. The dark layer may also contain a set or multiple pigment dispersions. Suitable pigments used in the color contrast layer may be any colored materials, which are practically insoluble in the medium in which they are incorporated. Suitable pigments include those described in Industrial Organic Pigments: Production, Properties, Applications by W. Herbst and K. Hunger, 1993, Wiley Publishers. These include, but are not limited to, Azo Pigments such as monoazo yellow and orange, diazo, naphthol, naphthol reds, azo lakes, benzimidazolone, diazo condensation, metal complex, isoindolinone and isoindolinic, polycyclic pigments such as phthalocyanine, quinacridone, perylene, perinone, diketopyrrolopyrrole, and thioindigo, and anthriquinone pigments such as anthrapyrimidine.

The functional layer may also comprise a dielectric material. A dielectric layer, for purposes of the present invention, is a layer that is not conductive or blocks the flow of electricity. This dielectric material may include a UV curable, thermoplastic, screen printable material, such as Electrodag 25208 dielectric coating from Acheson Corporation. The dielectric material forms a dielectric layer. This layer may include openings to define image areas, which are coincident with the openings. Since the image is viewed through a transparent substrate, the indicia are mirror imaged. The dielectric material may form an adhesive layer to subsequently bond a second electrode to the light modulating layer.

Liquid crystal domains may be preferably made using a limited coalescence methodology, as disclosed in U.S. Pat. Nos. 6,556,262 and 6,423,368, incorporated herein by reference. Limited coalescence is defined as dispersing a light modulating material below a given size, and using coalescent limiting material to limit the size of the resulting domains. Such materials are characterized as having a ratio of maximum to minimum domain size of less than 2:1. By use of the term "uniform domains", it is meant that domains are formed having a domain size variation of less than 2:1. Limited domain materials have improved optical properties.

An immiscible, field responsive light modulating material along with a quantity of colloidal particles is dispersed in an aqueous system and blended to form a dispersion of field responsive, light modulating material below a coalescence size. When the dispersion, also referred to herein as an emulsion, is dried, a coated material is produced which has a set of uniform domains having a plurality of electrically responsive optical states. The colloidal solid particle, functioning as an emulsifier, limits domain growth from a highly dispersed state. Uniformly sized liquid crystal domains are created and machine coated to manufacture light modulating, electrically responsive sheets with improved optical efficiency.

Specifically, a liquid crystal material may be dispersed an aqueous bath containing a water soluble binder material such as deionized gelatin, polyvinyl alcohol (PVA) or polyethylene oxide (PEO). Such compounds are machine coatable on equipment associated with photographic films. Preferably, the binder has a low ionic content, as the presence of ions in such a binder hinders the development of an electrical field across the dispersed liquid crystal material. Additionally, ions in the binder can migrate in the presence of an electrical field, chemically damaging the light modulating layer. The liquid crystal/gelatin emulsion is coated to a thickness of between 5 and 30 microns to optimize optical properties of light modulating layer. The coating thickness, size of the liquid crystal domains, and concentration of the domains of liquid crystal materials are designed for optimum optical properties.

In an exemplary embodiment, a liquid crystalline material is homogenized in the presence of finely divided silica, a coalescence limiting material, (LUDOX® from Dupont Corporation). A promoter material, such as a copolymer of adipic acid and 2-(methylamino) ethanol, is added to the aqueous bath to drive the colloidal particles to the liquid-liquid interface. The liquid crystal material is dispersed using ultrasound to create liquid crystal domains below 1 micron in size. When the ultrasound energy was removed, the liquid crystal material coalesced into domains of uniform size. The ratio of smallest to largest domain size varied by approximately 1:2. By varying the amount of silica and copolymer relative to the liquid crystalline material, uniform domain size emulsions of average diameter (by microscopy) approximately 1,3 And, 8 micron were produced. These emulsions were diluted into gelatin solution for subsequent coating.

Domains of a limited coalescent material maintain their uniform size after the addition of the surfactant and after being machine coated. There were few, if any, parasitic domains having undesirable electro-optical properties within the dried coatings produced by the limited coalescence method. Coatings made using limited coalescence having a domain size of about 2 microns may have the greatest translucence. For constant material concentrations and coating thickness, limited coalescent materials having a domain size of about 2 microns in size are significantly more translucent than any sized domains formed using conventional dispersion.

Sheets made by the limited coalescence process have curves similar to those of conventionally dispersed materials. However, with 8 to 10 micron domains, the material may demonstrate reduced scattering due to the elimination of parasitic domains. Conventionally dispersed cholesteric materials contain parasitic domains, which reflect light in wavelengths outside the wavelengths reflected by the cholesteric material. Limited coalescent dispersions have reduced reflection in other wavelengths due to the elimination of parasitic domains. The increased purity of color is important in the development of full color displays requiring well separated color channels to create a full color image. Limited coalescent cholesteric materials provide purer light reflectance than cholesteric liquid crystal material dispersed by conventional methods. Such materials may be produced using conventional photographic coating machinery.

In order to provide suitable formulations for applying a layer containing the liquid crystal domains, the dispersions are combined with a hydrophilic colloid, gelatin being the preferred material. Surfactants may be included with the liquid crystal dispersion prior to the addition of gelatin in order to prevent the removal of the particulate suspension stabilizing agent from the droplets. This aids in preventing further coalescence of the droplets.

As for the suspension stabilizing agents that surround and serve to prevent the coalescence of the droplets, any suitable colloidal stabilizing agent known in the art of forming polymeric particles by the addition reaction of ethylenically unsaturated monomers by the limited coalescence technique can be employed, such as, for example, inorganic materials such as, metal salt or hydroxides or oxides or clays, organic materials such as starches, sulfonated crosslinked organic homopolymers and resinous polymers as described, for example, in U.S. Pat. No. 2,932,629; silica as described in U.S. Pat. No. 4,833,060; copolymers such as copoly(styrene-2-hydroxyethyl methacrylate-methacrylic acid-ethylene glycol dimethacrylate) as described in U.S. Pat. No. 4,965,131 All of which are incorporated herein by reference. Silica is the preferred suspension stabilizing agent.

Suitable promoters to drive the suspension stabilizing agent to the interface of the droplets and the aqueous phase include sulfonated polystyrenes, alginates, carboxymethyl cellulose, tetramethyl ammonium hydroxide or chloride, triethylphenyl ammonium hydroxide, triethylphenyl ammonium hydroxide, triethylphenyl ammonium chloride, diethylaminoethylmethacrylate, water soluble complex resinous amine condensation products, such as the water soluble condensation product of diethanol amine and adipic acid, such as poly(adipic acid- co-methylaminoethanol), water soluble condensation products of ethylene oxide, urea, and formaldehyde and polyethyleneimine; gelatin, glue, casein, albumin, gluten, and methoxycellulose. The preferred promoter is triethylphenyl ammonium chloride.

In order to prevent the hydrophilic colloid from removing the suspension stabilizing agent from the surface of the droplets, suitable anionic surfactants may be included in the mixing step to prepare the coating composition such as polyisopropyl naphthalene-sodium sulfonate, sodium dodecyl sulfate, sodium dodecyl benzene sulfonate, as well as those anionic surfactants set forth in U.S. Pat. No. 5,326,687 and in Section XI of Research Disclosure 308119, December 1989, entitled "Photographic Silver Halide Emulsions, Preparations, Addenda, Processing, and Systems", both of which are incorporated herein by reference. Aromatic sulfonates are more preferred and polyisopropyl naphthalene sulfonate is most preferred.

Suitable hydrophilic binders include both naturally occurring substances such as proteins, protein derivatives, cellulose derivatives (e.g. cellulose esters), gelatins and gelatin derivatives, polysaccaharides, casein, and the like, and synthetic water permeable colloids such as poly(vinyl lactams), acrylamide polymers, poly(vinyl alcohol) and its derivatives, hydrolyzed polyvinyl acetates, polymers of alkyl and sulfoalkyl acrylates and methacrylates, polyamides, polyvinyl pyridine, acrylic acid polymers, maleic anhydride copolymers, polyalkylene oxide, methacrylamide copolymers, polyvinyl oxazolidinones, maleic acid copolymers, vinyl amine copolymers, methacrylic acid copolymers, acryloyloxyalkyl acrylate and methacrylates, vinyl imidazole copolymers, vinyl sulfide copolymers, and homopolymer or copolymers containing styrene sulfonic acid. Gelatin, with or without hardener, is preferred.

The following examples are provided to illustrate the invention.

EXAMPLES

1. Preparation of Compounds of the Invention:

The synthesis of representative compounds of the invention, as shown in Scheme 1 Below, begins with preparation of racemic (R/S)-Int-7, followed by chiral resolution of this enantiomeric mixture, and finally derivatization of the enantiomerically enriched spirodiphenols (R)-Int-7 and (S)-Int-7. The preparation of 1,1'-spirobiindan-7,7'-diol is accomplished using a minor variant of the method described by Birman, et al., (vide supra). This synthetic route is outlined in Scheme 1.

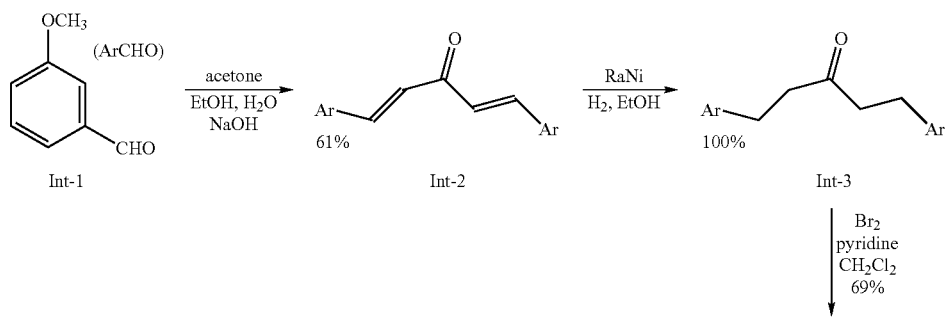

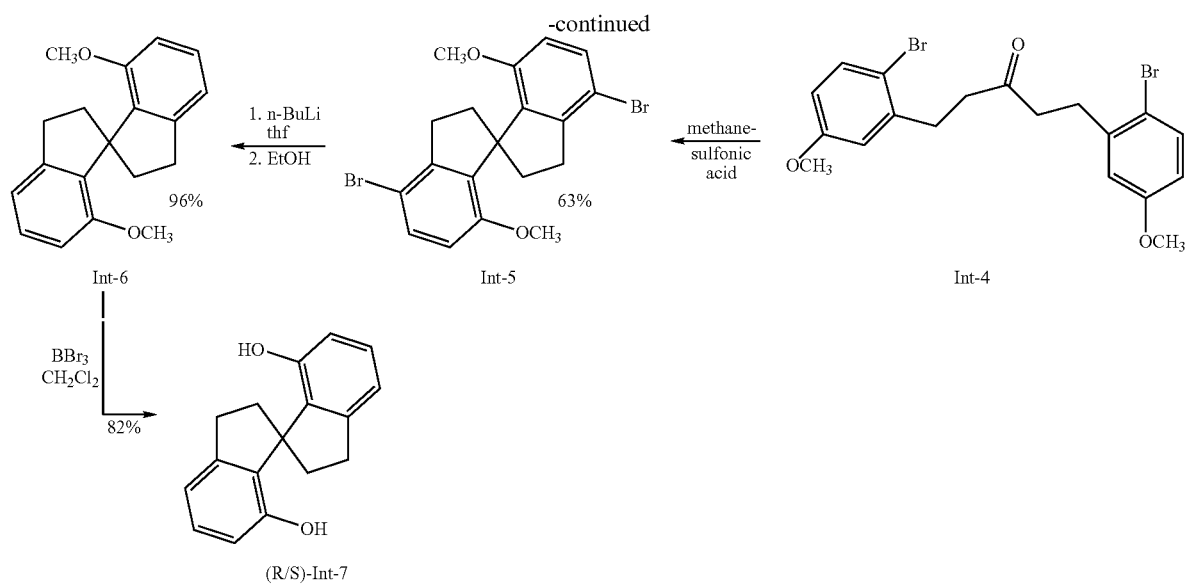

Again using the procedures of Birman, et al., the racemic (R/S)-Int-7 was resolved via intermediary preparation and separation of menthyl carbonate esters, according to Scheme 2 below. Then finally, the thus prepared, enantiomerically enriched spirodiphenols were derivatized using standard synthetic procedures. Included is a detailed, representative esterification procedure Scheme 3, shown below, after Scheme 2.

Scheme 2

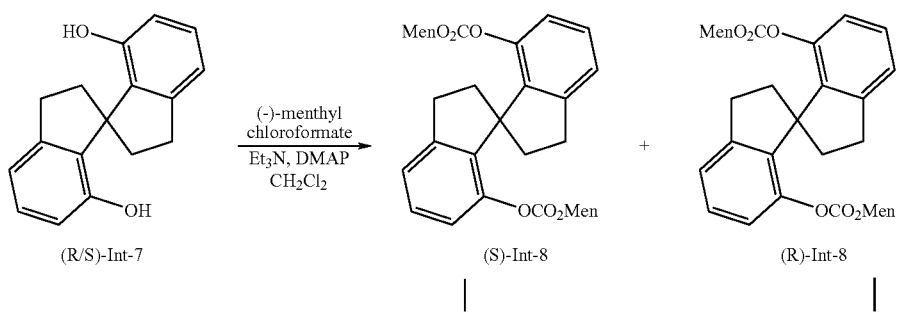

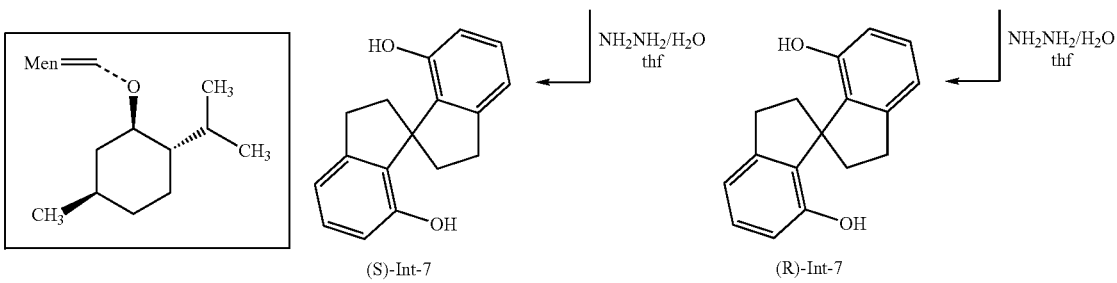

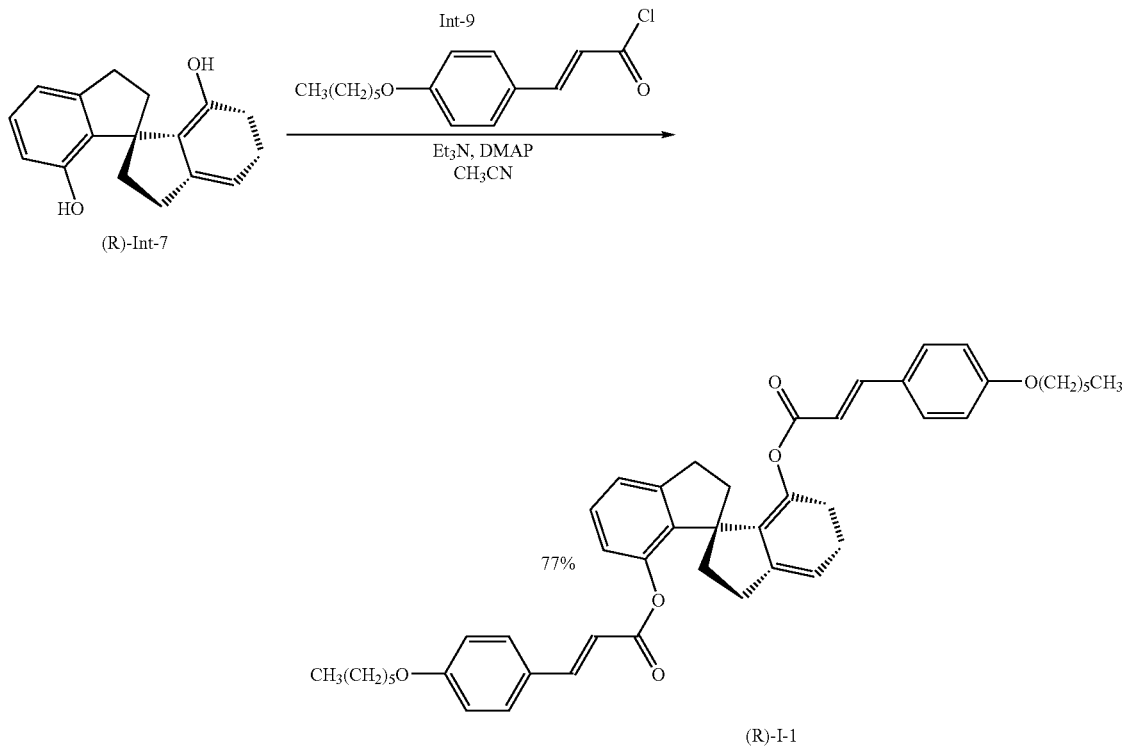

Preparation of (R)-I-1: A solution of (R)-Int-7 (1.25 g, 5.0 mmol; CAS 223259-62-9), E-4-hexyloxycinnamoyl chloride (2.70 g, 5.8 mmol; Int-9; CAS 77251-79-7) in 35 mL of acetonitrile was treated sequentially with triethylamine (2.1 mL; CAS 121-44-8) and 4-dimethylaminopyridine (0.1 g, DMAP; CAS 1122-58-3); a mildly exothermic reaction ensued with precipitate formation. After stirring at ambient temperature for 20 hours the mixture was partitioned between dilute hydrochloric acid and ethyl acetate. The organics were washed with dilute aqueous sodium bicarbonate, dried, and concentrated in vacuo to provide a glassy residue. This material was triturated with 50 mL of methanol to afford (R)-I-1 As a solid, 3.22 g (90%). This solid was recrystallized from 200 mL methanol, which upon chilling and filtration provided (R)-I-1 As a colorless solid, 2.74 g (77%). This material proved chromatically homogenous and displayed spectral characteristics consistent with its assigned structure.

Other compounds of the invention can be prepared via modifications of this procedure or via implementation of reactions known to those skilled in the art.

The following examples are presented to illustrate the practice of this invention, but are not meant to limit it in any way. All percentages are by weight unless otherwise indicated.

Example 1

Several substantially enantiomerically pure derivatives of the invention were prepared (vide supra) and these compounds were combined with the commercially available liquid crystalline compound 4-n-pentyl-4'-cyanobiphenyl, 5CB, having the following structure:

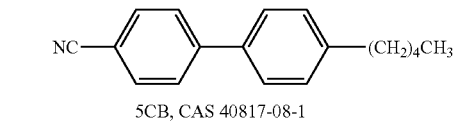

5CB, CAS 40817-08-1

The mixtures contained 0.2 to 6 parts of the enantiomerically pure derivative and 99.8 to 94 parts of 5CB and were heated above their clearing point, thoroughly mixed and allowed to cool to ambient temperature.

The pitches of these samples were then measured either from standard reflectance response curves or by the method of Dogic and Fraden, pg. 7821-7822 (vide supra) and calibrated using a polarizing microscope to directly measure the chiral nematic's period. When viewed under a polarizing microscope the cholesteric phase displays typical dark and bright stripes indicating that molecules are perpendicular and parallel to the plane of polarizers. The distance between two bright lines is equivalent to half the value of the pitch $P_0$.

Results of this experiment are found in Table 1 showing the HTP's in 5CB at ambient temperatures.

TABLE 1

| Compound | $\beta$ ($\mu m^{-1}$) (mole fraction) |
| --- | --- |
| I-1 | 182 |
| I-2 | 146 |
| I-3 | 150 |
| I-5 | 142 |
| I-6 | 306 |

These data demonstrate that compounds of the invention act as effective chiral dopants in 5CB.

Example 2

Several substantially enantiomerically pure derivatives of the invention were prepared (vide supra) and were combined with the commercially available liquid crystalline mixture BL087 (described as a mixture of 5CB (25-40%), the structurally related 2CB wherein the n-pentyl group is replaced by an ethyl group (10-25%), and a proprietary liquid crystal mixture (35-65%)) available from Merck KGaA, Darmstadt, Germany. The mixtures contained 0.2 to 6 parts of the enantiomerically pure derivative and 99.8 to 94 parts of BL087 and were heated above their clearing point, thoroughly mixed and allowed to cool to ambient temperature. The pitches of these samples were then measured either from standard reflectance response curves or by the method of Dogic and Fraden (vide supra). The HTP (β) of these samples was then calculated as described above, except on a weight percent basis. Results of this experiment are found in Table 2 Below showing HTP's in 5CB at ambient temperatures.

TABLE 2

| Compound | β ($\mu m^{-1}$) (Weight percent) |
|---|---|
| I-1 | 0.55 |
| I-2 | 0.48 |
| I-3 | 0.59 |
| I-5 | 0.50 |
| I-6 | 0.77 |

These data further demonstrate that compounds of the invention act as effective chiral dopants in BL087.

Example 3

Several substantially enantiomerically pure derivatives of the invention were prepared (vide infra) and evaluated using a standard procedure. A commercial liquid crystal mixture, BL087 Available from Merck KGaA (Darmstadt, Germany) was combined with 1% by weight of the phototunable test sample and sufficient additional dopant (Dpt-1, CAS 119812-20-3) such that the final composition displayed a median reflection at the reported initial wavelength (TABLE 3). This test sample(these amounts varied due to the differing HTP's and the procedure just above will allow these experiments to be reproduced)was then heated above the isotropic point until homogenous then cooled to ambient temperature. This test composition was then placed between a microscope slide and a cover slip and irradiated. The test object was irradiated using a calibrated mercury UV lamp with a peak output at 366 nm. Reflection spectra of the test sample were taken prior to irradiation and incrementally during the irradiation using a Perkin-Elmer UV-VIS spectrometer Lambda 2. A plot of median peak reflection in nanometers versus accumulated irradiation in $Jcm^{-2}$ then allowed assessment of the phototunability of these new materials. The data in TABLE 3 summarize the shift in wavelength of these test samples during a 1 $Jcm^{-2}$ irradiation as outlined above. It should be noted that the test dopants and the Dpt-1 were found to have opposite-handed twisting in this test formulation such that the test dopants reduce the helical pitch imparted by Dpt-1.

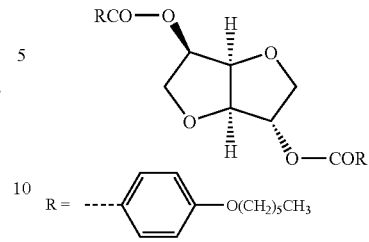

Thus in this case, upon irradiation the photodopant becomes less effective at reducing the pitch imparted by Dpt-1 and the reflection moves to shorter wavelengths, indicative of the higher net helical twisting power of the dopant pair.

TABLE 3

| Compound | Initial Wavelength (nm) | Final Wavelength (nm) | Wavelength Change (nm) |
|---|---|---|---|
| I-1 | 604 | 554 | −50 |
| I-2 | 625 | 585 | −40 |
| I-3 | 700 | 675 | −25 |
| I-4 | 650 | 585 | −65 |
| I-5 | 650 | 600 | −25 |
| I-6 | 640 | 550 | −90 |

These data clearly indicate that these new compounds effectively alter the helical pitch and therefore the reflectivity of liquid crystal formulations upon irradiation. In concert, the data from these three examples demonstrate that the compounds of the invention act as effective chiral dopants for nematic liquid crystal formulations and upon irradiation provide the desired change in helical twisting power.

The invention has been described in detail with particular reference to certain preferred embodiments thereof, but it will be understood that variations and modifications can be effected within the spirit and scope of the invention.

The invention claimed is:

1. A material composition comprising an enantiomeric excess of one enantiomer of a compound

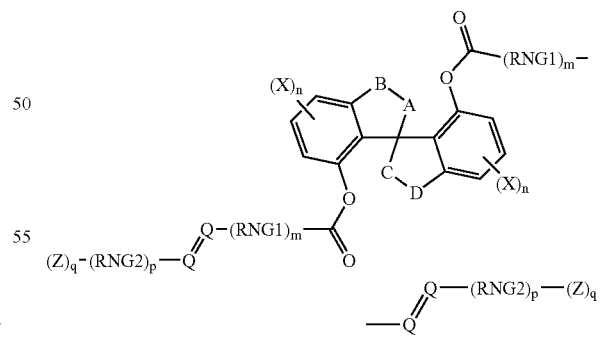

wherein:
A and C are the same and selected from one of $CH_2$, —O—, and —C(R1)(R2)-;
B and D are the same, but independent of A and C, and are selected from one of $CH_2$, —O—, and C(R1)(R2);
wherein R1 and R2 are independently selected from a $C_1$-$C_5$ alkyl group and $C_1$-$C_5$ alkoxy group and optionally wherein if R1 and R2 groups are on the same ring, they can form a fused ring;

X is each independently selected from one of one or more H atoms and a halogen;

Z is selected from one of an H atom, halogen, CN, straight, chain, branched alkyl, alkoxyl, and nitrogen based substituent groups;

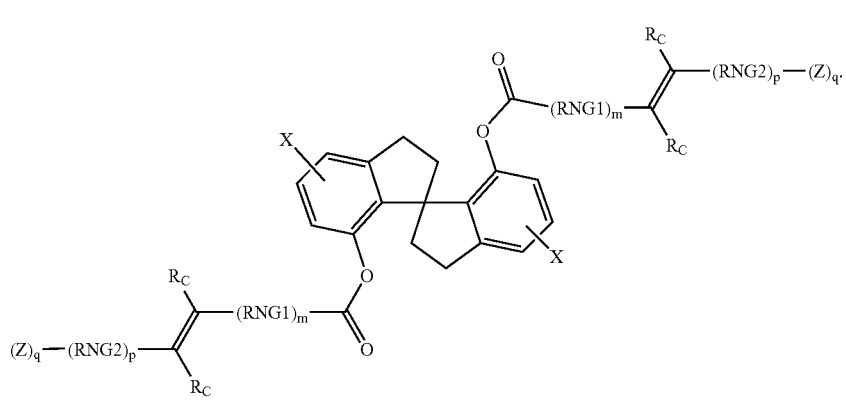

RNG1 and RNG2 are each independently selected from one of 1,4-phenylene in which, one or more CH groups may be replaced by N, 1,4-cyclohexylene in which, one or two non-adjacent CH2 groups may be replaced by O and/or S, 1,4-cyclohexenylene, 1,4-bicyclo(2,2,2)octylene, piperidine-1,4-diyl, naphthalene-2,6-diyl, decahydronaphthalene-2,6-diyl, 1,2,3,4-tetrahydronaphthalene-2,6-diyl, and mono- or poly-substituted derivatives of such compounds substituted with halogen, cyano or nitro groups, or alkyl, alkoxy or alkanoyl groups having 1 to 12 C atoms wherein one or more H atoms may be substituted by an F or Cl;

n represents an integer independently varying from 0 to 3;
m represents an integer independently varying from 0 to 2;
p represents an integer independently varying from 1 to 4;
q represents an integer independently varying from 0 to 5; and
Q each independently represents a carbon C—Rc, or nitrogen, wherein Rc is independently hydrogen or any substituent.

2. The material of claim 1 wherein A and B comprise a first five membered ring, and C and D comprise a second five membered ring, wherein said first ring and said second ring share a spirocarbon atom to which A and C are attached.

3. The material of claim 1 wherein A, B, C and D are independently methylene or di-substituted carbon (C(R1)(R2)).

4. The material of claim 1 wherein A, B, C and D are methylene (—CH$_2$—).

5. The material of claim 1 wherein Z is an alkoxy (C1-C8) or a nitrogen based substituent group.

6. The material of claim 1 wherein Z is an alkoxy (C1-C8).

7. The material of claim 1 wherein X is hydrogen.

8. The material of claim 1 wherein n is 0.

9. The material of claim 1 wherein q is 1.

10. The material of claim 1 wherein m is independently 0 or 1.

11. The material of claim 1 wherein p is 1.

12. The material of claim 1 wherein the stereochemistry of (-Q=Q-) independently is trans (E) or cis (Z).

13. The material of claim 1 wherein the stereochemistry of (-Q=Q-) is trans.

14. The material of claim 1 wherein Q is C—R$_c$.

15. The material of claim 14 wherein R$_c$ is hydrogen.

16. The material of claim 1 represented by Structure 2:

17. The material of claim 16 wherein R$_c$ is hydrogen.

18. The material of claim 16 wherein the stereochemistry of (R$_c$C=CR$_c$) independently is trans or cis.

19. The material of claim 18 wherein R$_c$C=CR$_c$ is trans.

20. The material of claim 16 wherein Z is an alkoxy (C1-C8) or a nitrogen based substituent group.

21. The material of claim 16 wherein Z is an alkoxy (C1-C8).

22. The material of claim 16 wherein q is 1.

23. The material of claim 16 wherein RNG1 and RGN2 are 1,4-phenylene.

24. The material of claim 16 wherein m is independently 0 or 1.

25. The material of claim 16 wherein p is 1.

26. The material of claim 16 wherein X is hydrogen.

27. The material of claim 16 wherein n is 1.

28. The material of claim 1 represented by Structure 3:

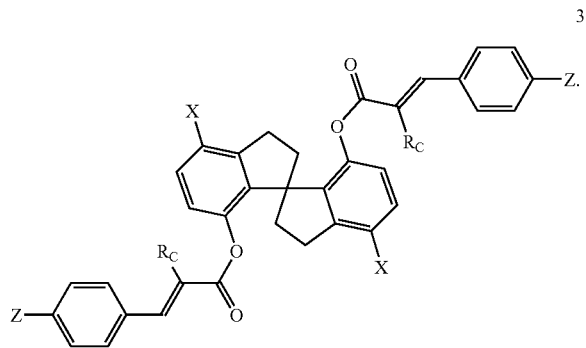

29. The material of claim 28 wherein $R_c$ is hydrogen.

30. The material of claim 28 wherein X is hydrogen.

31. The material of claim 28 wherein Z is an alkoxy (C1-C8) or a nitrogen based substituent group.

32. The material of claim 28 wherein Z is an alkoxy (C1-C8).

* * * * *

UNITED STATES PATENT AND TRADEMARK OFFICE
CERTIFICATE OF CORRECTION

PATENT NO. : 7,470,376 B2  
APPLICATION NO. : 10/977110  
DATED : December 30, 2008  
INVENTOR(S) : Welter et al.

Page 1 of 1

It is certified that error appears in the above-identified patent and that said Letters Patent is hereby corrected as shown below:

Column 47, lines 6-8. Should Read:

Z is selected from one of an H atom, halogen, CN, straight chain, branched alkyl, alkoxyl, and nitrogen based substituent groups;

Column 47, lines 53-55. Should Read:

3. The material of claim 1 wherein A, B, C and D are independently methylene or di-substituted carbon (C(R1)(R2)).

Signed and Sealed this

Seventeenth Day of March, 2009

JOHN DOLL  
*Acting Director of the United States Patent and Trademark Office*